US006668786B2

(12) United States Patent
Endoh et al.

(10) Patent No.: US 6,668,786 B2
(45) Date of Patent: *Dec. 30, 2003

(54) ROTARY TYPE FLUID MACHINE, VANE TYPE FLUID MACHINE, AND WASTE HEAT RECOVERING DEVICE FOR INTERNAL COMBUSTION ENGINE

(75) Inventors: Tsuneo Endoh, Wako (JP); Kensuke Honma, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/321,452

(22) Filed: Dec. 18, 2002

(65) Prior Publication Data

US 2003/0084867 A1 May 8, 2003

Related U.S. Application Data

(62) Division of application No. 09/926,117, filed on Sep. 5, 2001, now Pat. No. 6,513,482.

(30) Foreign Application Priority Data

Mar. 5, 1999 (JP) .............................................. 11-57933
Mar. 5, 1999 (JP) .............................................. 11-57934

(51) Int. Cl.[7] .............................................. F02B 53/04
(52) U.S. Cl. .......................... 123/227; 60/651; 60/670; 418/264; 418/266; 418/150; 91/498
(58) Field of Search ................................ 123/227, 226, 123/245; 418/264, 266, 150; 60/651, 670, 300; 91/498; 62/402

(56) References Cited

U.S. PATENT DOCUMENTS 3,585,904 A    6/1971  White ........................... 91/498
3,774,397 A  * 11/1973  Engdahl ....................... 418/266
4,437,308 A  *  3/1984  Fischer ......................... 60/651
6,513,482 B1 *  2/2003  Endoh et al. ................ 123/227

FOREIGN PATENT DOCUMENTS

| GB | 2-195-400 A | 4/1988 | ........... F01C/1/344 |
| GB | 2 309 748 A | 6/1997 | ............. 418/201.1 |
| JP | 57-16293 | 1/1982 | .................. 418/150 |
| JP | 58008208 A | * 1/1983 | ........... F01K/25/00 |
| JP | 58-48706 | 3/1983 | .................... 60/519 |
| JP | 59-41602 | 3/1984 | ........... F01C/1/344 |
| JP | 60-206990 | 10/1985 | .................. 418/209 |
| JP | 61-76708 | 4/1986 | ........... F01K/25/10 |
| JP | 64-29676 | 1/1989 | |
| JP | 2000-320301 | 11/2000 | ........... F01C/1/344 |
| JP | 2001254601 A | * 9/2001 | ........... F01C/1/344 |
| JP | 2001254602 A | * 9/2001 | ........... F01C/1/344 |

* cited by examiner

Primary Examiner—Thomas Denion
Assistant Examiner—Thai-Ba Trieu
(74) Attorney, Agent, or Firm—Arent Fox Kintner Plotkin & Kahn, PLLC

(57) ABSTRACT

Rotary type fluid machine includes a casing 7, a rotor 31 and a plurality of vane-piston units U1–U12 which are disposed in a radiate arrangement on the rotor 31. Each of the vane-piston units U1–U12 has a vane 42 sliding in a rotor chamber 14 and a piston 41 placed in abutment against a non-slide side of the vane 42. When it functions as an expanding machine 4, the expansion of a high pressure gas is used to operate the pistons 41 thereby to rotate the rotor 31 via vanes 42 and the expansion of a low pressure gas caused by a pressure reduction in the high pressure gas is used to rotate the rotor 31 via the vanes 41. On the other hand, when it functions as a compressing machine, the rotation of rotor 31 is used to supply a low pressure air to the side of pistons 41 via vanes 42 and further, the pistons 41 are operated by the vanes 42 to convert the low pressure air to the high pressure air. Thus, a rotary type fluid machine having expanding and compressing functions, with the merits belonging to the piston type and the merits belonging to the vane type, can be provided.

5 Claims, 22 Drawing Sheets

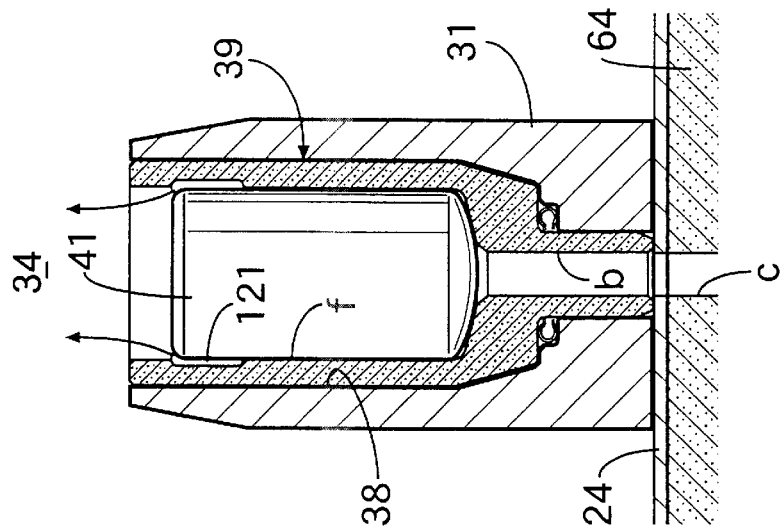
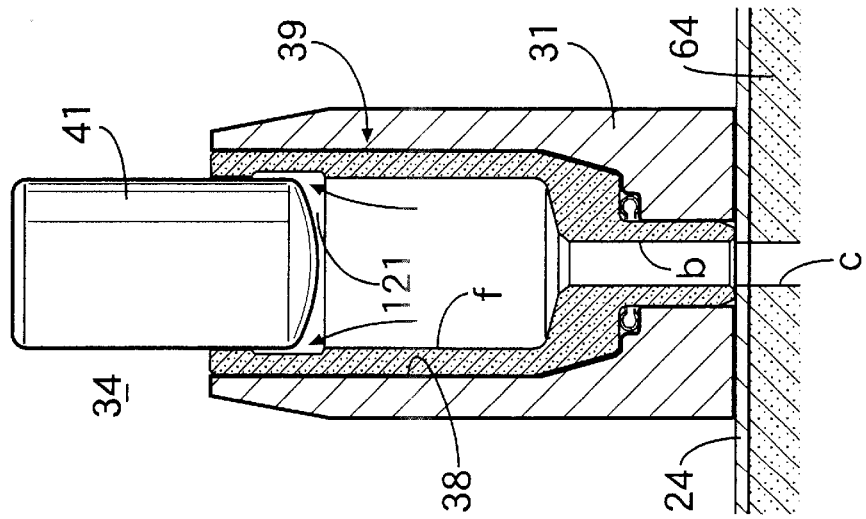

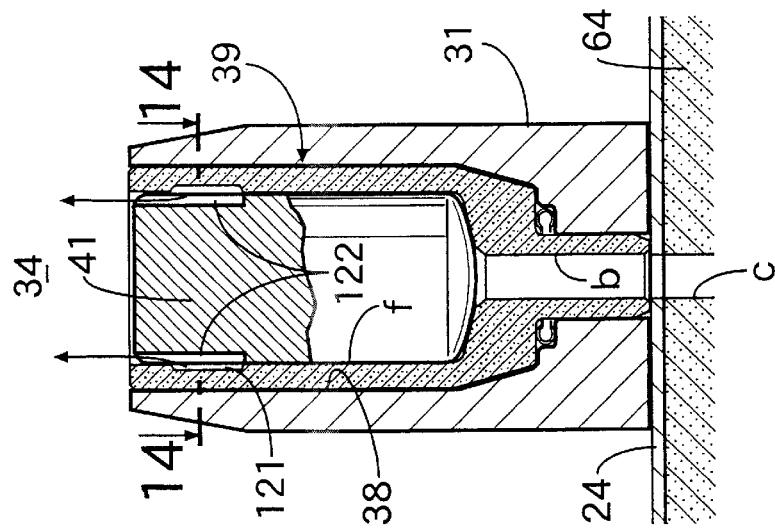
FIG. 13A TOP DEAD CENTER
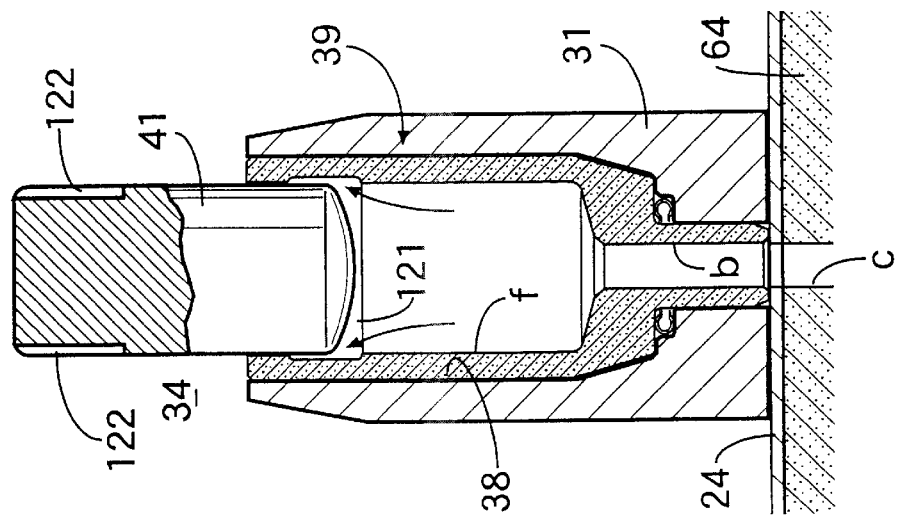
FIG. 13B BOTTOM DEAD CENTER

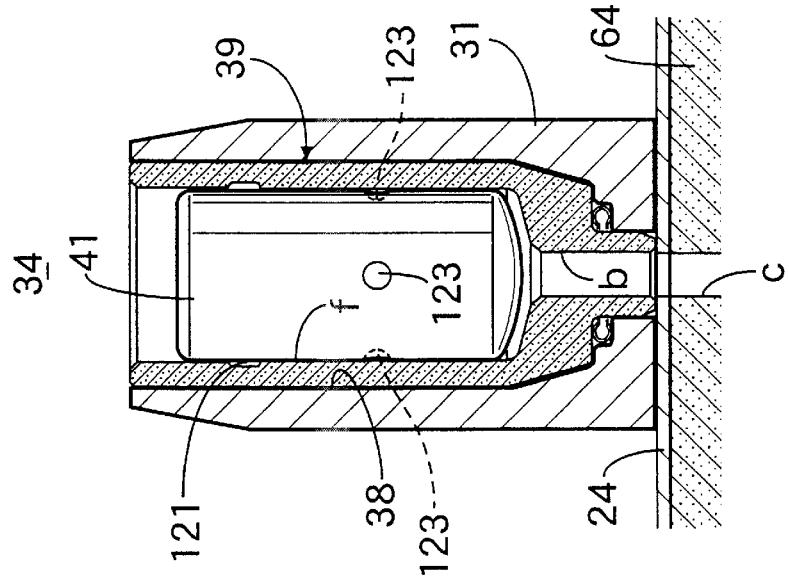
FIG.15A TOP DEAD CENTER
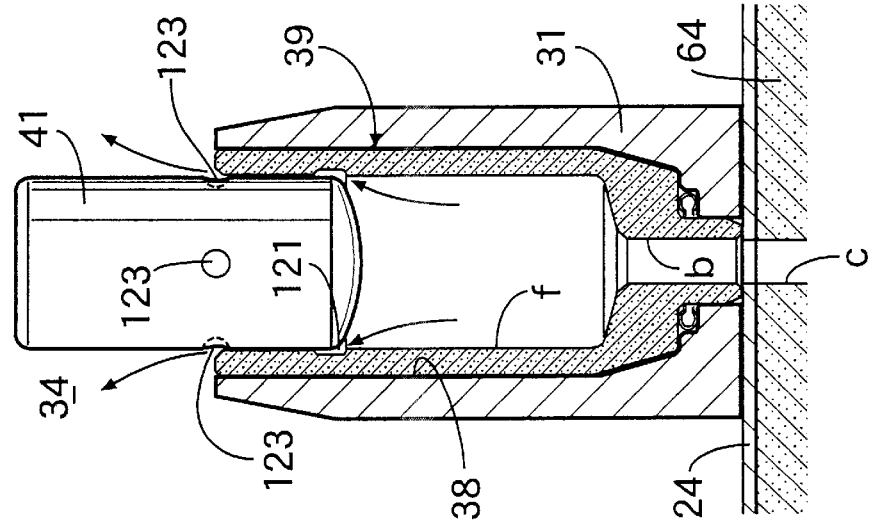
FIG.15B BOTTOM DEAD CENTER

ROTARY TYPE FLUID MACHINE, VANE TYPE FLUID MACHINE, AND WASTE HEAT RECOVERING DEVICE FOR INTERNAL COMBUSTION ENGINE

This is a Divisional of application Ser. No. 09/926,117 filed Sep. 5, 2001 now U.S. Pat. No. 6,513,482. The disclosure of the prior application is hereby incorporated by reference herein in its entirety.

TECHNICAL FIELD

The present invention relates to a rotary type fluid machine and a vane type fluid machine which can also be used as an expanding machine and/or a compressing machine, and a waste heat recovering device for an internal combustion engine for extracting mechanical energy utilizing waste heat of the internal combustion engine.

BACKGROUND ART

Japanese Patent Application Laid-open No. 6-88523 describes a waste heat recovering device for an internal combustion engine for generating high temperature and high pressure vapor with heat energy of exhaust gas of the internal combustion engine and supplying the high temperature and high pressure vapor to a turbine type expanding machine to generate mechanical energy.

Japanese Patent Application Laid-open No. 59-41602 describes a double multi-vane type rotary machine. This is such that a circular vane support ring is disposed between an oval outer cam ring and an oval inner cam ring, and that outer ends and inner ends of a plurality of vanes supported slidably in radial directions by the vane support ring are placed in abutment against an inner peripheral surface of the outer cam ring and an outer peripheral surface of the inner cam ring, respectively. Thus, when the vane support ring exerts a relative rotation with respect to the outer cam ring and inner cam ring, volume of a plurality of operation chambers comparted by the vanes between the outer cam ring and the vane support ring is expanded or compressed to function as an expanding machine or a compressing machine, and volume of a plurality of operation chambers comparted by the vanes between the inner cam ring and the vane support ring is expanded or compressed to function as an expanding machine or a compressing machine.

In this double multi-vane type rotary machine, outer and inner rotary machines can be used as respectively independent expanding machines, the outer and inner rotary machines can be used as respectively independent compressing machines, or one and the other of the outer and inner rotary machines can be respectively used as the expanding machine and compressing machine.

Japanese Patent Application Laid-open No. 60-206990 describes a vane type rotary machine which can be used as an expanding machine or a compressing machine. This is such, that a circular intermediate cylinder is disposed in an offset manner between a circular outer cam ring and a circular inner cam ring, which are disposed concentrically, and that outer ends and inner ends of a plurality of vanes supported slidably in the radial directions by the intermediate cylinder are placed in abutment against an inner peripheral surface of the outer cam ring and an outer peripheral surface of the inner cam ring, respectively. Thus, when the intermediate cylinder exerts a relative rotation with respect to the outer cam ring and inner cam ring, volume of a plurality of operation chambers comparted by the vanes between the outer cam ring and the vane support ring is expanded or compressed to function as an expanding machine or a compressing machine, and volume of a plurality of operation chambers comparted by the vanes between the inner cam ring and the vane support ring is expanded or compressed to function as an expanding machine or a compressing machine.

In this vane type rotary machine, outer and inner rotary machines can be used as respectively independent expanding machines, the outer and inner rotary machines can be used as respectively independent compressing machines, or a working fluid having passed through one of the outer and inner rotary machines can be made to pass through the other to connect the outer and inner rotary machines in series for operation as a two-stage expanding machine or a two-stage compressing machine.

Japanese Patent Application Laid-open No. 57-16293 describes a vane type rotary compressor. This is such that a circular rotor is rotatably disposed in a non-circular cam ring, and that a roller provided at an intermediate portion of each vane is guided in engagement with a roller track provided in a casing in such a manner that tips of a plurality of vanes radially supported by the rotor move along an inner peripheral surface of the cam ring.

Japanese Patent Application Laid-open No. 64-29676 describes a radial plunger pump. This is such that a plurality of cylinders are radially formed in a rotor disposed in an offset manner in a circular cam ring, and that tips of plungers slidably fitted to the cylinders are placed in abutment against an inner peripheral surface of the cam ring to be reciprocated and thereby operated as a pump.

Japanese Patent Application Laid-open No. 58-48706 describes a Rankine cycle apparatus comprising a vane type expanding machine. This is such that high temperature and high pressure vapor energy generated by an evaporating machine using a gas burner as a heat source is converted to mechanical energy via a vane type expanding machine, and that resultant reduced temperature and reduced pressure vapor is condensed by a condensing machine and then returned again to the evaporating piachine by a supply pump.

The applicant proposes a waste heat recovering device for an internal combustion engine having an evaporating machine for generating high temperature and high pressure vapor using waste heat as a heat source, an expanding machine for generating an output by expansion of the high temperature and high pressure vapor, and a condensing machine for liquefying reduced temperature and reduced pressure vapor exhausted from the expanding machine, in order to recover waste heat of the internal combustion engine, in Japanese Patent Application Nos. 11-57933 and 11-57934.

The expanding machine proposed in the Japanese Patent Application No. 11-57933 or Japanese Patent Application No. 11-57934 is such that a piston is slidably fitted to a cylinder radially formed in a rotor, and that high temperature and high pressure vapor is successively supplied from a fixed shaft disposed at the center of the rotor to each cylinder to drive the piston and thereby rotate the rotor. A rotary valve for supplying high temperature and high pressure vapor from the inside of the hollow fixed shaft to each cylinder with predetermined timing is such that a seal block made of carbon for guiding the high temperature and high pressure vapor is resiliently in sliding contact with an inner peripheral surface of the hollow shaft formed with a through-hole communicating with the cylinder, and that the spring force is generated by a spring and a bellows operated by the high temperature and high pressure vapor.

It should be noted here that the expanding machine disclosed in the Japanese Patent Application Laid-open No. 6-88523 is the turbine type expanding machine of the non-displacement type, but known as a displacement type expanding machine are a piston type expanding machine and a vane type expanding machine.

Each of the machines disclosed in the Japanese Patent Application Laid-open No. 59-41602 and the Japanese Patent Application Laid-open No. 60-206990 comprises the plurality of vane type rotary machines disposed inside and outside in the radial directions, and the vane type rotary machine has a simple structure of a conversion mechanism between pressure energy and mechanical energy and can deal with a large flow amount of working fluid with a compact structure, while there is a problem that a large leak amount of the working fluid from a slide portion of the vane makes it difficult to increase efficiency.

The radial plunger pump described in the Japanese Patent Application Laid-open No. 64-29676 has high sealing performance of a working fluid because the working fluid is compressed by a piston slidably fitted to the cylinder, and can minimize an efficiency reduction due to a leak even when using a high pressure working fluid, while there is a problem of requiring a crank mechanism or slanting mechanism for converting reciprocating motion of the piston into rotary motion, which makes the structure complex.

Therefore, it is desirable to make a rotary type fluid machine, vane type fluid machine, or waste heat recovering device for an internal combustion engine have both merits belonging to the piston type and merits belonging to the vane type. Further, in the vane type fluid machine or waste heat recovering device for the internal combustion engine, it is desirable to minimize a leak amount of a working fluid from a slide portion of a vane.

In the expanding machine proposed in the Japanese Patent Application No. 11-57933 and Japanese Patent Application No. 11-57934, the high temperature and high pressure vapor in the cylinder on the rotor is sometimes condensed to be liquefied at the time of actuation when the temperature is not sufficiently raised, and moreover, there is also a possibility that water used as a lubricating medium may permeate the cylinder. When the piston is moved in the cylinder in a state where the water is thus trapped in the cylinder, there is a possibility that normal operation of the cylinder and piston maybe inhibited, and hence, the water trapped in the cylinder is required to be rapidly exhausted outwards.

The expanding machine proposed in the Japanese Patent Application No. 11-57933 or Japanese Patent Application No. 11-57934 requires not only the seal block made of carbon but also the spring or bellows for pressing the same against the inner peripheral surface of the hollow shaft, thus there is a problem of complexity of a structure which increases the number of components. Further, difference in coefficient of thermal expansion between the seal block made of carbon and the hollow shaft of SUS-based metal causes radial distortion at the time of high temperature, and there is a possibility of a leak of part of the high temperature and high pressure vapor without contribution to driving of the rotor.

DISCLOSURE OF THE INVENTION

A first object of the present invention is to make a rotary type fluid machine, a vane type fluid machine, or a waste heat recovering device for an internal combustion engine have both merits belonging to the piston type and merits belonging to the vane type.

A second object of the present invention is to greatly increase sealing performance between a rotor chamber and a vane in a vane type fluid machine or a waste heat recovering device for an internal combustion engine.

A third object of the present invention is, in a rotary type fluid machine, to prevent water condensed in a cylinder at the time of actuation or the like when temperature is low or water supplied as a lubricating medium from being trapped in the cylinder.

A fourth object of the present invention is to reliably prevent a leak of a high pressure fluid from a rotary valve of a rotary type fluid machine with a simple structure including a reduced number of components.

To achieve the first object, according to a first feature of the present invention, there is proposed a rotary type fluid machine having an expanding function and a compressing function, including a casing having a rotor chamber, a rotor accommodated in the rotor chamber, and a plurality of vane-piston units which are radially disposed in the rotor around a rotary axis thereof and freely reciprocated in the respective radial directions, each of the vane-piston units having a vane sliding in the rotor chamber and a piston placed in abutment against a non-slide side of the vane, wherein when functioning as an expanding machine, expansion of a high pressure fluid is used to operate the piston to rotate the rotor via a power conversion device and expansion of a low pressure fluid caused by a pressure reduction in the high pressure fluid is used to rotate the rotor via the vane, while when functioning as a compressing machine, rotation of the rotor is used to supply a low pressure fluid to the side of the piston via the vane and the piston is operated by the vane to convert the low pressure fluid to a high pressure fluid.

With the above first feature, the rotary type fluid machine having the expanding function and compressing function can be provided, wherein the piston is allowed for works on a high pressure side to achieve efficiency improvement by restraining leak loss, while the vane is allowed for works on a low pressure side to efficiently deal with a large amount of flow.

To achieve the second object, according to a second feature of the present invention, there is proposed a vane type fluid machine, including a casing having a rotor chamber, a rotor accommodated in the rotor chamber, and a plurality of vanes which are radially disposed in the rotor around a rotary axis thereof and freely reciprocated in the respective radial directions, wherein a section of the rotor chamber in a phantom plane including the rotary axis of the rotor is formed of a pair of semi-circular sections with diameters thereof opposed to each other and a rectangular section formed by connecting opposed one ends of both the diameters to each other and opposed other ends of the diameters to each other, respectively, each of the vanes includes a vane body and a seal member mounted to the vane body and pressed against the rotor chamber with a spring force, and the seal member has a semi-circular arcuate portion sliding on the inner peripheral surface defined by the semi-circular section of the rotor chamber and a pair of parallel portions respectively sliding on opposed inner end surfaces defined by the rectangular section.

With the above second feature, the vane type fluid machine which has greatly increased sealing performance between the rotor chamber and the vane can be provided.

To achieve the first object, according to a third feature of the present invention, there is provided a waste heat recovering device for an internal combustion engine having an evaporating machine using waste heat from the internal combustion engine as a heat source to generate high pressure vapor, an expanding machine for generating an output by expansion of the high pressure vapor, and a condensing machine for liquefying low pressure vapor exhausted from the expanding machine, characterized in that the expanding machine includes a casing having a rotor chamber, a rotor accommodated in the rotor chamber, and a plurality of vane-piston units which are radially disposed in the rotor around a rotary axis thereof and freely reciprocated in the respective radial directions, each of the vane-piston units including a vane sliding in the rotor chamber and a piston placed in abutment against a non-slide side of the vane, expansion of the high pressure vapor being used to operate the piston to rotate the rotor via the vane, and expansion of a low pressure gas caused by a pressure reduction in the high pressure gas being used to rotate the rotor via the vane.

With the above third feature, in the expanding machine, when the piston is allowed for works on a high pressure side as described above, efficiency can be increased by restraining leak loss, while when the vane is allowed for works on a low pressure side, a large amount of flow can be efficiently dealt with. This permits extracting a high output from the waste heat of the internal combustion engine.

To achieve the second object, according to a fourth feature of the present invention, there is proposed a waste heat recovering device for an internal combustion engine having an evaporating machine using waste heat from the internal combustion engine as a heat source to generate high pressure vapor, an expanding machine for generating an output by expansion of the high pressure vapor, and a condensing machine for liquefying low pressure vapor exhausted from the expanding machine, characterized in that the expanding machine includes a casing having a rotor chamber, a rotor accommodated in the rotor chamber, and a plurality of vanes which are radially disposed in the rotor around a rotary axis thereof and freely reciprocated in the respective radial directions, a section of the rotor chamber in a phantom plane including the rotary axis of the rotor being formed of a pair of semi-circular sections with diameters thereof opposed to each other and a rectangular section formed by connecting opposed one ends of both the diameters to each other and opposed other ends of the diameters to each other, respectively, each of the vanes including a vane body and a seal member mounted to the vane body and pressed against the rotor chamber with a spring force, and the seal member having a semi-circular arcuate portion sliding on the inner peripheral surface defined by the semi-circular section of the rotor chamber and a pair of parallel portions respectively sliding on opposed inner end surfaces defined by the rectangular section.

With the above fourth feature, in the vane type expanding machine, sealing performance between the rotor chamber and the vane can be sufficiently increased to greatly improve efficiency under a high pressure.

To achieve the third object, according to a fifth feature of the present invention, there is proposed a rotary type fluid machine having an expanding function and a compressing function including a casing having a rotor chamber, a rotor accommodated in the rotor chamber, and a plurality of vane-piston units which are radially disposed in the rotor around a rotary axis thereof and freely reciprocated in the respective radial directions, each of the vane-piston units including a vane sliding in the rotor chamber and a piston placed in abutment against a non-slide side of the vane, and when functioning as an expanding machine, expansion of a high pressure fluid being used to operate the piston to rotate the rotor via a power conversion device and expansion of a low pressure fluid caused by a pressure reduction in the high pressure fluid being used to rotate the rotor via the vane, while when functioning as a compressing machine, rotation of the rotor being used to supply a low pressure fluid to the side of the piston via the vane and the piston being operated by the vane to convert the low pressure fluid to a high pressure fluid, characterized in that the rotary type fluid machine includes fluid exhausting means for maintaining airtight between the piston and cylinder during a stroke of the piston sliding in the cylinder formed in the rotor, and for exhausting a fluid stored in the cylinder at a stroke end of the piston outside the cylinder.

With the above fifth feature, even when water used as a lubricating medium permeates the cylinder or even when the high temperature and high pressure vapor in the cylinder of the rotor is condensed to be liquefied at the time of low temperature actuation or the like of the rotary type fluid machine which functions as the expanding machine, water trapped in the cylinder can be rapidly exhausted outward at the stroke end of the piston by the fluid exhausting means and inhibition of normal operation of the piston in the cylinder can reliably be prevented.

To achieve the fourth object, according to a sixth feature of the present invention, there is proposed a rotary type fluid machine having an expanding function and a compressing function, including a casing having a rotor chamber, a rotor accommodated in the rotor chamber, and a plurality of vane-piston units which are radially disposed in the rotor around a rotary axis thereof and freely reciprocated in the respective radial directions, each of the vane-piston units including a vane sliding in the rotor chamber and a piston placed in abutment against a non-slide side of the vane, when functioning as an expanding machine, expansion of a high pressure fluid being used to operate the piston to rotate the rotor via a power conversion device and expansion of a low pressure fluid caused by a pressure reduction in the high pressure fluid being used to rotate the rotor via the vane, while when functioning as a compressing machine, rotation of the rotor being used to supply a low pressure fluid to the side of the piston via the vane and the piston being operated by the vane to convert the low pressure fluid to a high pressure fluid, characterized in that first passages for supplying and exhausting a high pressure fluid to a cylinder formed in the rotor and second passages for supplying and exhausting a low pressure fluid from the cylinder to a rotor chamber are formed in a fixed shaft, and that a switchover mechanism which is rotated integrally with the rotor to selectively connect the first passages or the second passages to the cylinder is fitted rotatably and in a sealing condition relative to the fixed shaft.

According to the sixth feature, a switchover mechanism which is rotated integrally with the rotor to selectively communicate the first passages or the second passages to the cylinder is fitted rotatably and in a sealing condition relative to the fixed shaft. Therefore, a leak of the high pressure fluid can reliably be prevented with a simple structure including a reduced number of components, requiring no special urging means such as a spring or bellows, simply by controlling clearance between the fixed shaft and switchover mechanism.

To achieve the fourth object, according to a seventh feature of the present invention, there is proposed a rotary type fluid machine having an expanding function and a compressing function, including a casing having a rotor chamber, a rotor accommodated in the rotor chamber, and a plurality of vane-piston units which are radially disposed in the rotor around a rotary axis thereof and freely reciprocated in the respective radial directions, each of the vane-piston units including a vane sliding in the rotor chamber and a piston placed in abutment against a non-slide side of the vane, when functioning as an expanding machine, expansion of a high pressure fluid being used to operate the piston to rotate the rotor via a power conversion device and expansion of a low pressure fluid caused by a pressure reduction in the high pressure fluid being used to rotate the rotor via the vane, while when functioning as a compressing machine, rotation of the rotor being used to supply a low pressure fluid to the side of the piston via the vane and the piston being operated by the vane to convert the low pressure fluid to a high pressure fluid, characterized in that first passages for supplying and exhausting a high pressure fluid to a cylinder formed in the rotor and second passages for supplying and exhausting a low pressure fluid from the cylinder to a rotor chamber are formed in a fixed shaft, that a switch over mechanism which is rotated integrally with the rotor to selectively communicate the first passages or the second passages to the cylinder is fitted rotatably and in a sealing condition relative to the fixed shaft, and that port grooves surrounding outer peripheries of the first passages are formed on a slide surface between the fixed shaft and switchover mechanism.

With the above seventh feature, a switchover mechanism which is rotated integrally with the rotor to selectively communicate the first passages or the second passages to the cylinder is fitted rotatably and in a sealing condition relative to the fixed shaft, and the port grooves surrounding the outer peripheries of the first passages are formed on a slide surface between the fixed shaft and the switchover mechanism. Therefore, even when the high pressure fluid supplied from the first passages is leaked without flowing into the cylinder via the switchover mechanism, or even when the high pressure fluid compressed by the piston is leaked without being supplied to the first passages, the high pressure fluid can be captured by the port grooves to minimize an outward leak, thus when using the rotary type fluid machine as the expanding machine, improvement in output performance can be achieved, and when using the rotary type fluid machine as the compressing machine, improvement in compressing performance can be achieved.

BRIEF DESCRIPTION OF THE DRAWINGS

FIGS. 1 to 11 show a first embodiment of the present invention, wherein:

FIG. 1 is a schematic view of a waste heat recovering device for an internal combustion engine;

FIG. 2 is a vertical sectional view of an expanding machine (a sectional view taken along a line 2—2 in FIG. 5);

FIG. 3 is an enlarged sectional view of around a rotary axis in FIG. 2;

FIG. 4 is a sectional view on the line 4—4 in FIG. 2;

FIG. 5 is an enlarged sectional view of an essential part taken along a line 5—5 in FIG. 2;

FIG. 6 is an explanatory view of sectional configurations of a rotor chamber and a rotor;

FIG. 7 is a front view of a vane body;

FIG. 8 is a side view of the vane body;

FIG. 9 is a sectional view taken along a line 9—9 in FIG. 7;

FIG. 10 is a front view of a seal member; and

FIG. 11 is an enlarged view of around a rotary axis in FIG. 4.

FIGS. 12A and 12B are explanatory views of water exhaust action of a cylinder according to a second embodiment of the present invention.

FIGS. 13A to 14 show a third embodiment of the present invention, wherein:

FIGS. 13A and 13B are explanatory views of water exhaust action of a cylinder; and FIG. 14 is a sectional view taken along a line 14—14 of FIG. 13B.

FIGS. 15A and 15B are explanatory views of water exhaust action of a cylinder according to a fourth embodiment of the present invention.

FIGS. 17 to 21 show a fifth embodiment of the present invention, wherein:

FIG. 17 is an enlarged sectional view of around a rotary axis corresponding to FIG. 3;

FIG. 18 is an enlarged view of around a rotary axis corresponding to FIG. 11;

FIG. 19 is an enlarged view of a part 19 in FIG. 17;

FIG. 20 is an enlarged sectional view taken along a line 20—20 in FIG. 19; and FIG. 21 is an enlarged sectional view taken along a line 21—21 of FIG. 19.

FIGS. 22 to 25 show a sixth embodiment of the present invention, wherein:

FIG. 22 is an enlarged view of around a rotary axis corresponding to FIG. 11;

FIG. 23 is a view taken along a line 23—23 of FIG. 22;

FIG. 24 is an enlarged view corresponding to an essential part of FIG. 3; and FIG. 25 is a view of a state where a fixed shaft in FIG. 24 is not broken.

BEST MODE FOR CARRYING OUT THE INVENTION

First, a first embodiment of the present invention will be described on the basis of FIGS. 1 to 11.

Figure 1:
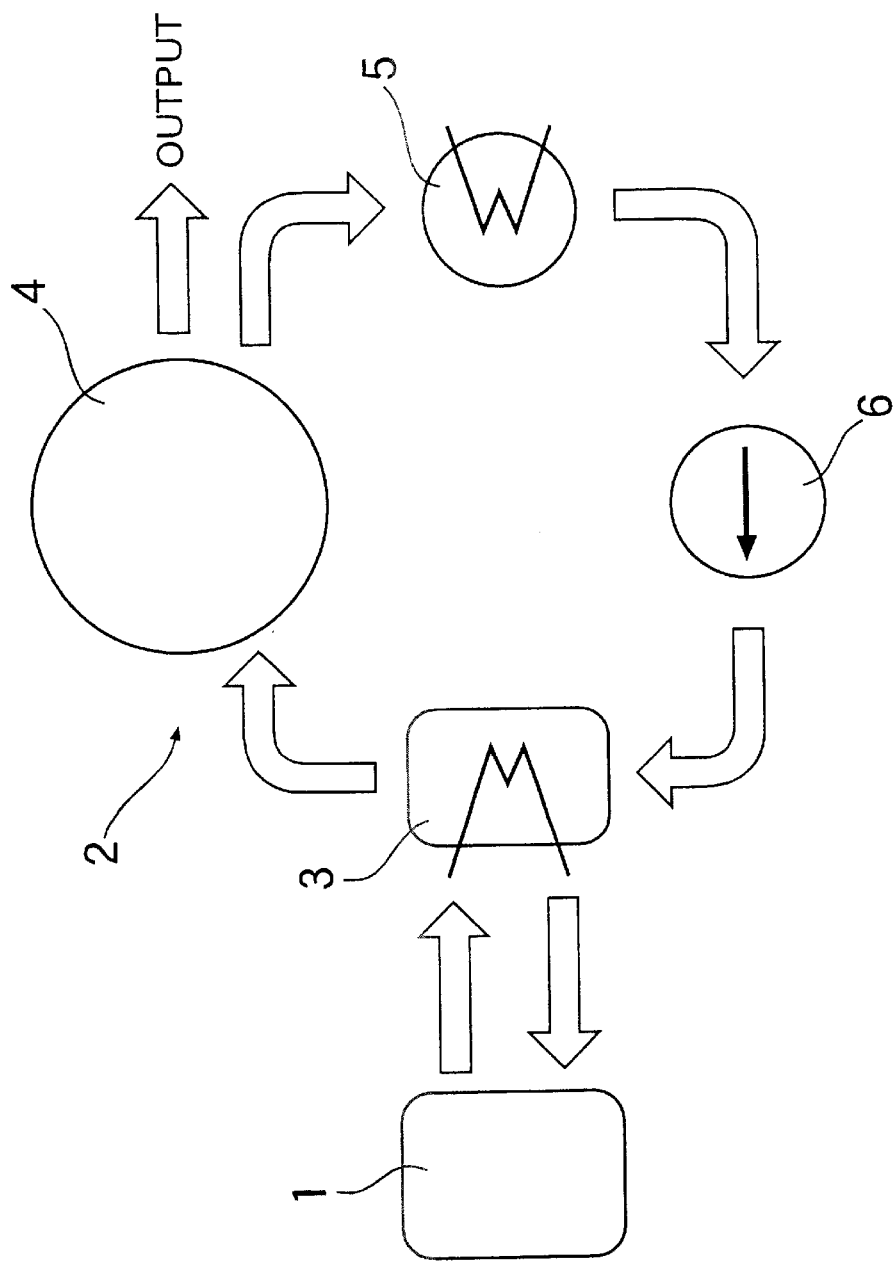

In FIG. 1, a waste heat recovering device 2 of an internal combustion engine 1 comprises an evaporating machine 3 for generating high pressure vapor, that is, high temperature and high pressure vapor, generated by increasing temperature of high pressure liquid, for example, water, using waste heat, for example, the exhaust gas of the internal combustion engine as a heat source, an expanding machine 4 for generating an output by expansion of the high temperature and high pressure vapor, a condensing machine 5 for liquefying the vapor, which is exhausted from the expanding machine 4, with reduced temperature and pressure after the expansion, that is, reduced temperature and reduced pressure vapor, and a supply pump 6 for pressurizing and supplying liquid, for example, water, from the condensing machine 5 to the evaporating machine 3.

The expanding machine 4 has a specific structure and is configured as follows.

In FIGS. 2 to 5, a casing 7 comprises first and second half bodies 8,9 made of metal. Each of the half bodies 8,9 comprises a main body 11 having a substantially oval recess 10 and a circular flange 12 integral with the main body 11, and the circular flanges 12 are superposed via a metal gasket 13 to form a substantially oval rotor chamber 14. An outer surface of the main body 11 of the first half body 8 is covered with a main body 16, in the form of a deep bowl, of a shell-shaped member 15, a circular flange 17 integral with the main body 16 is superposed on the circular flange 12 of the first half body 8 via a gasket 18, and three circular flanges 12, 12, 17 are fastened by a bolt 19 at a plurality of circumferential positions. A junction chamber 20 is thereby formed between the main bodies 11 and 16 of the shell-shaped member 15 and the first half body 8.

The main bodies 11 of the half bodies 8, 9 have hollow shaft receiving tubes 21, 22 projecting outwardly at their outer surfaces, and by the hollow shaft receiving tubes 21, 22, a large diameter portion 24 of a hollow output shaft 23 penetrating the rotor chamber 14 is turnably supported via a bearing metal (or bearing made of resin) 25. An axis L of the output shaft 23 thereby passes an intersection point of a long diameter and a short diameter in the substantially oval rotor chamber 14. A small diameter portion 26 of the output shaft 23 projects outwardly beyond a hole 27 at the hollow shaft receiving tube 22 of the second half body 9 and is connected to a transmission shaft 28 via spline coupling 29. The small diameter portion 26 and the hole 27 are sealed by two seal rings 30.

Accommodated in the rotor chamber 14 is a circular rotor 31, and a shaft mounting hole 32 at its center is in a fitted relationship to the large diameter portion 24 of the output shaft 23 to provide an engagement portion 33 between the two 31, 24. A rotary axis of the rotor 31 thereby matches the axis L of the output shaft 23, thus "L" is commonly used as reference character of the rotary axis.

The rotor 31 is formed with a plurality of, in this embodiment twelve, slot-shaped spaces 34 radially extending from the shaft mounting hole 32 about the rotary axis L at even intervals on the circumference. Each space 34 is circumferentially narrow and in substantially U shape in a phantom plane perpendicular to both end surfaces 35 so as to sequentially open into the both end surfaces 35 and an outer peripheral surface 36 of the rotor 31.

In the respective slot-shaped spaces 34, first to twelfth vane-piston units U1–U12 with the same structure are mounted so as to freely reciprocate in the respective radial directions as follows. The space 34 of substantially U shape is formed with a stepped hole 38 at a portion 37 comparting the inner peripheral side of the space 34, and a stepped cylinder member 39 made of ceramic (or carbon) is fitted in the stepped hole 38. An end surface of a small diameter portion a of the cylinder member 39 abuts against an outer peripheral surface of the large diameter portion 24 of the output shaft 23, and a small diameter hole b thereof communicates with a through-hole c opening into the outer peripheral surface of the large diameter portion 24. A guide tube 40 is disposed outside the cylinder member 39 so as to be positioned coaxially with the member 39. An outer end of the guide tube 40 is locked by an opening of the space 34 on the outer peripheral surface of the rotor 31, and an inner end of the guide tube 40 is fitted in a large diameter hole d of the stepped hole 38 to abut against the cylinder member 39. The guide tube 40 has a pair of slots e extending from its outer end to around its inner end in an opposed manner, and both slots e face the space 34. A piston 41 made of ceramic is slidably fitted in a large diameter cylinder hole f of the cylinder member 39, and a tip side of the piston 41 is always positioned in the guide tube 40.

Figure 2:
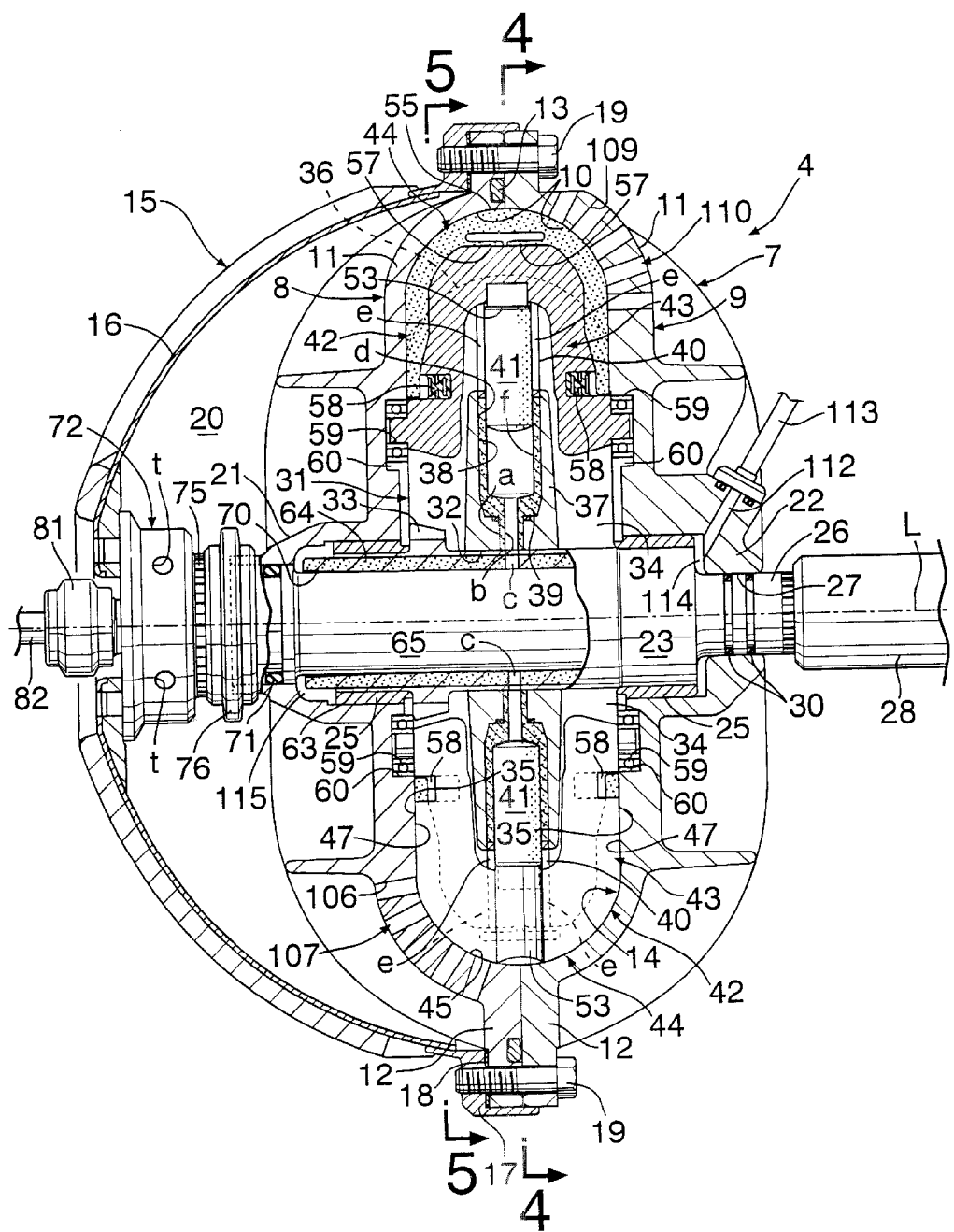
Figure 6:
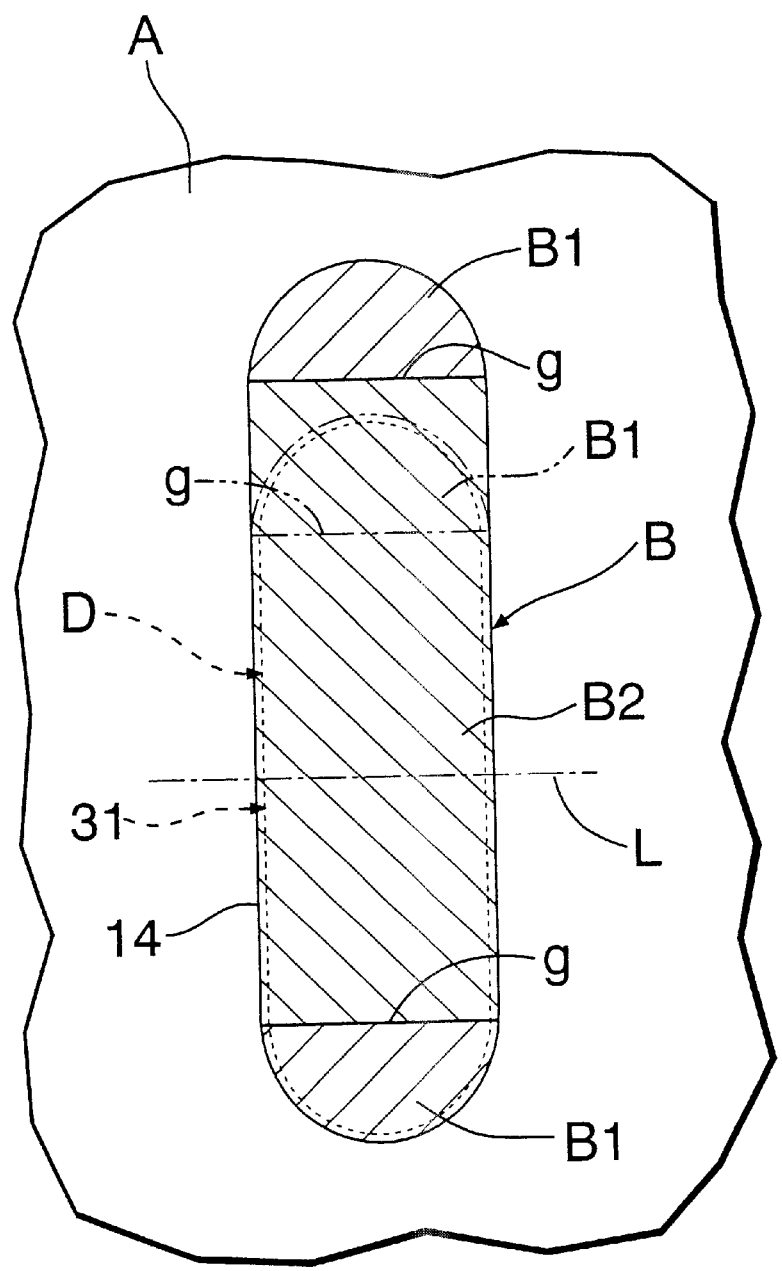
Figure 7:
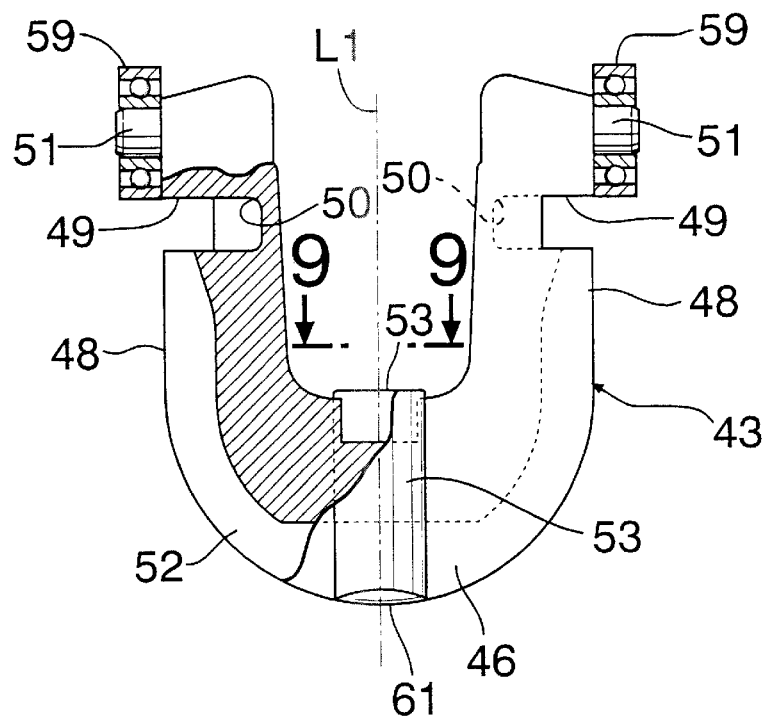
Figure 8:
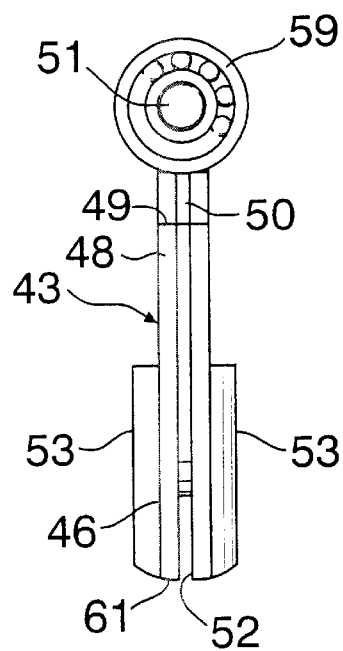
Figure 9:
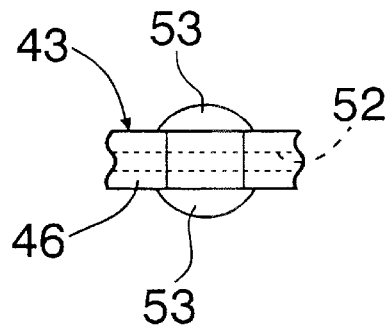
Figure 10:
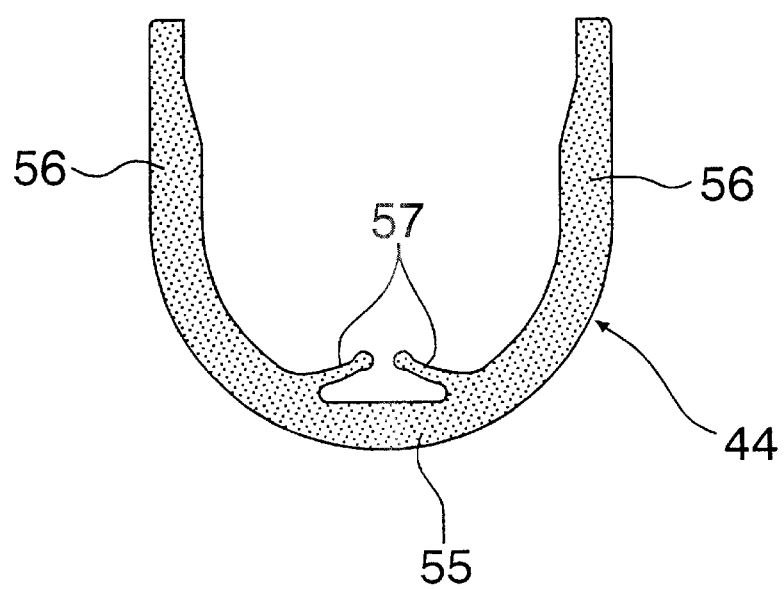

As shown in FIGS. 2 and 6, a section B of the rotor chamber 14 in a phantom plane A including the rotary axis L of the rotor 31 is formed of a pair of semi-circular sections B1 with their diameters g opposed to each other and a rectangular section B2 formed by connecting opposed one ends of diameters g of semi-circular sections B1 to each other and opposed other ends of the diameters g to each other, respectively, and is substantially in the form of an athletic track. In FIG. 6, a part illustrated by a solid line shows the largest section including the long diameter, while a part partially illustrated by a double-dotted chain line shows the smallest section including the short diameter. The rotor 31 has a section D slightly smaller than the smallest section including the short diameter of the rotor chamber 14, as shown by a dotted line in FIG. 6.

As is clearly shown in FIGS. 2, 7 to 10, a vane 42 comprises a vane body 43 in the form of substantially U-shaped plate (horseshoe shape), a seal member 44 in the form of substantially U-shaped plate mounted to the vane body 43, and a vane spring 58.

The vane body 43 has a semi-circular arcuate portion 46 corresponding to an inner peripheral surface 45 by the semi-circular section B1 of the rotor chamber 14, and a pair of parallel portions 48 corresponding to opposed inner end surfaces 47 by the rectangular section B2. Each parallel portion 48 is provided, at its end side, with a rectangular notch 49, a rectangular blind hole 50 opening into the bottom surface, and a short shaft 51 located at a side closer to the end than the rectangular notch 49 and protruding outwards. Outer peripheral portions of the semi-circular arcuate portion 46 and both parallel portions 48 are sequentially formed with U-shaped grooves 52 opening outwardly, and both ends of the U-shaped grooves 52 respectively communicate with both rectangular notches 49. Further, both plane parts of the semi-circular arcuate portion 46 are respectively provided with a pair of projecting strips 53 having broken circular sections. Both projecting strips 53 are disposed such that an axis L1 of a phantom cylinder thereby matches a straight line which bisects a space between the parallel portions 48 and circumferentially bisects the semi-circular arcuate portion 46. Inner ends of the projecting strips 53 slightly project into the space between the parallel portions 48.

The seal member 44 is made of PTFE, for example, and has a semi-circular arcuate portion 55 sliding on the inner peripheral surface 45 by the semi-circular section B1 of the rotor chamber 14 and a pair of parallel portions 56 sliding on the opposed inner end surfaces 47 by the rectangular section B2. Further, a pair of elastic pawls 57 is provided on an inner peripheral surface side of the semi-circular arcuate portion 55 so as to be deflected inwardly.

The seal member 44 is mounted to the U-shaped groove 52 of the vane body 43, a vane spring 58 is fitted in each blind hole 50, and further a roller 59 with a ball bearing structure is mounted to each short shaft 51. Each vane 42 is slidably accommodated in each slot-shaped space 34 of the rotor 31, where both projecting strips 53 of the vane body 43 are positioned in the guide tube 40 and both side portions of the projecting strips 53 are respectively positioned in both slots e of the guide tube 40, thereby allowing the inner end surfaces of the projecting strips S3 to abut against the outer end surface of the piston 41. Both rollers 59 are respectively placed in rotatable engagement with a substantially oval annular groove 60 formed on the opposed inner end surfaces 47 of the first and second half bodies 8, 9. A distance between the annular groove 60 and the rotor chamber 14 is constant throughout their circumferences. Forward motion of the piston 41 is converted to rotary motion of the rotor 31 via the vane 42 by engagement between the roller 59 and the annular groove 60.

Figure 5:
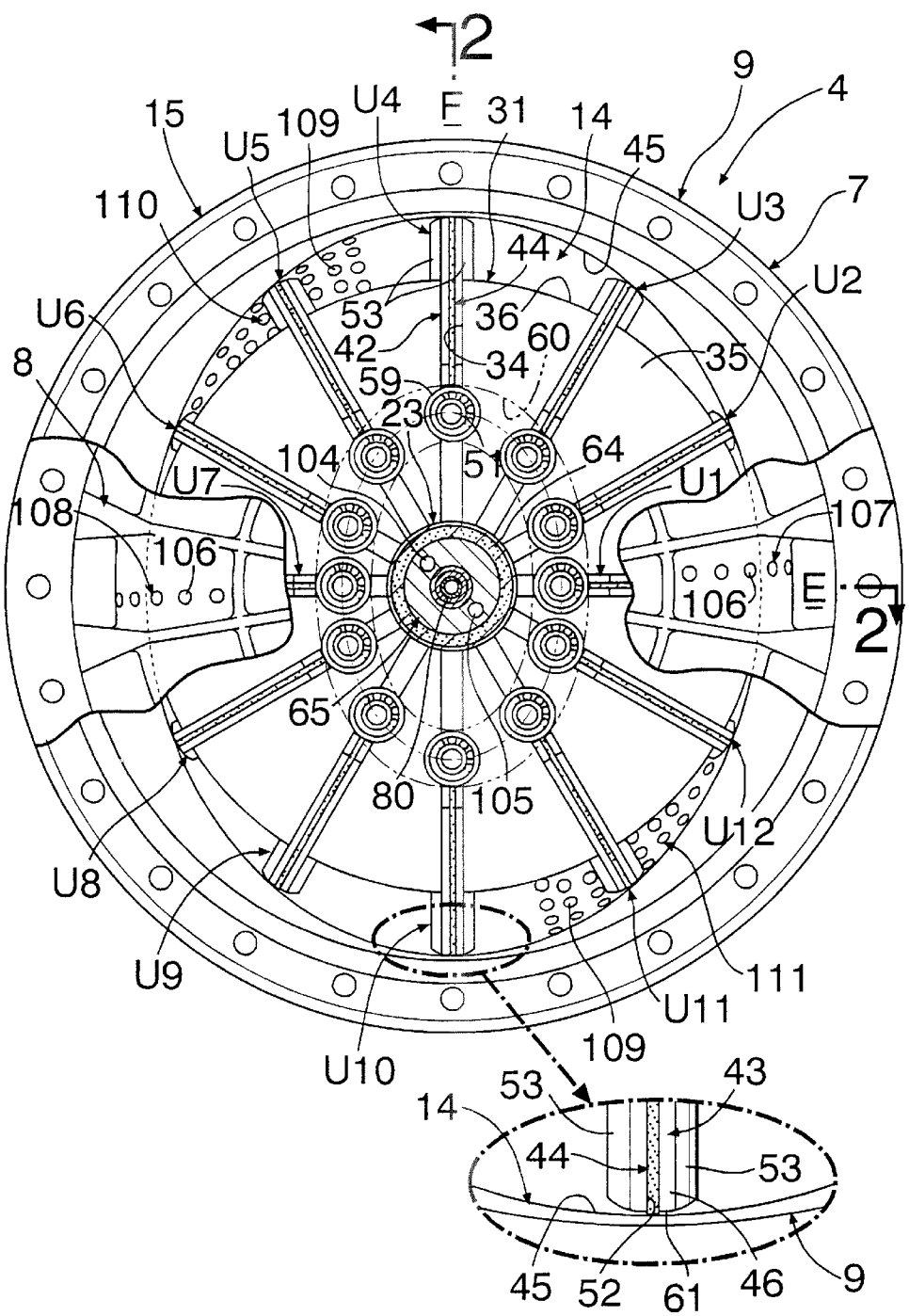

By the roller 59 cooperating with the annular groove 60, as clearly shown in FIG. 5, a semi-circular arcuate tip surface 61 on the semi-circular arcuate portion 46 of the vane body 43 is always spaced apart from the inner peripheral surface 45 of the rotor chamber 14, and the parallel portions 48 are always spaced apart from the opposed inner end surface 47 of the rotor chamber 14, thereby reducing friction losses. Since a track is regulated by the annular grooves 60 formed of two strips in a pair, the vane 42 is axially rotated at a minute displacement angle via the roller 59 by an error between right and left tracks, and a contact pressure with the inner peripheral surface 45 of the rotor chamber 14 is increased. At this time, in the vane body 43 in the form of substantially U-shaped plate (horseshoe shape), a radial length of a contact portion with the casing 7 is shorter than that in a square (rectangular) vane, so that the displacement amount can be substantially reduced. As is clearly shown in FIG. 2, in the seal member 44, the parallel portions 56 are brought into close contact with the opposed inner end surfaces 47 of the rotor chamber 14 by a spring force of each vane spring 58, and especially exert seal action on the annular groove 60 via ends of the parallel portions 56 and the vane 42. The semi-circular arcuate portion 55 is brought into close contact with the inner peripheral surface 45 by the elastic pawls 57 pressed between the vane body 43 and the inner peripheral surface 45 in the rotor chamber 14. That is, the vane 42 in the form of substantially U-shaped plate (horseshoe shape) has less inflection point than the square (rectangular) vane, which allows good close contact. The square vane has corners, which makes it difficult to maintain the sealing performance. The sealing performance between the vane 42 and the rotor chamber 14 thereby becomes good. Further, the vane 42 and the rotor chamber 14 are deformed concurrently with thermal expansion. At this time, the vane 42 of substantially U shape is deformed with evener similar figures than the square vane, thereby reducing variation of clearance between the vane 42 and rotor chamber 14 and allowing good sealing performance to be maintained.

Figure 3:
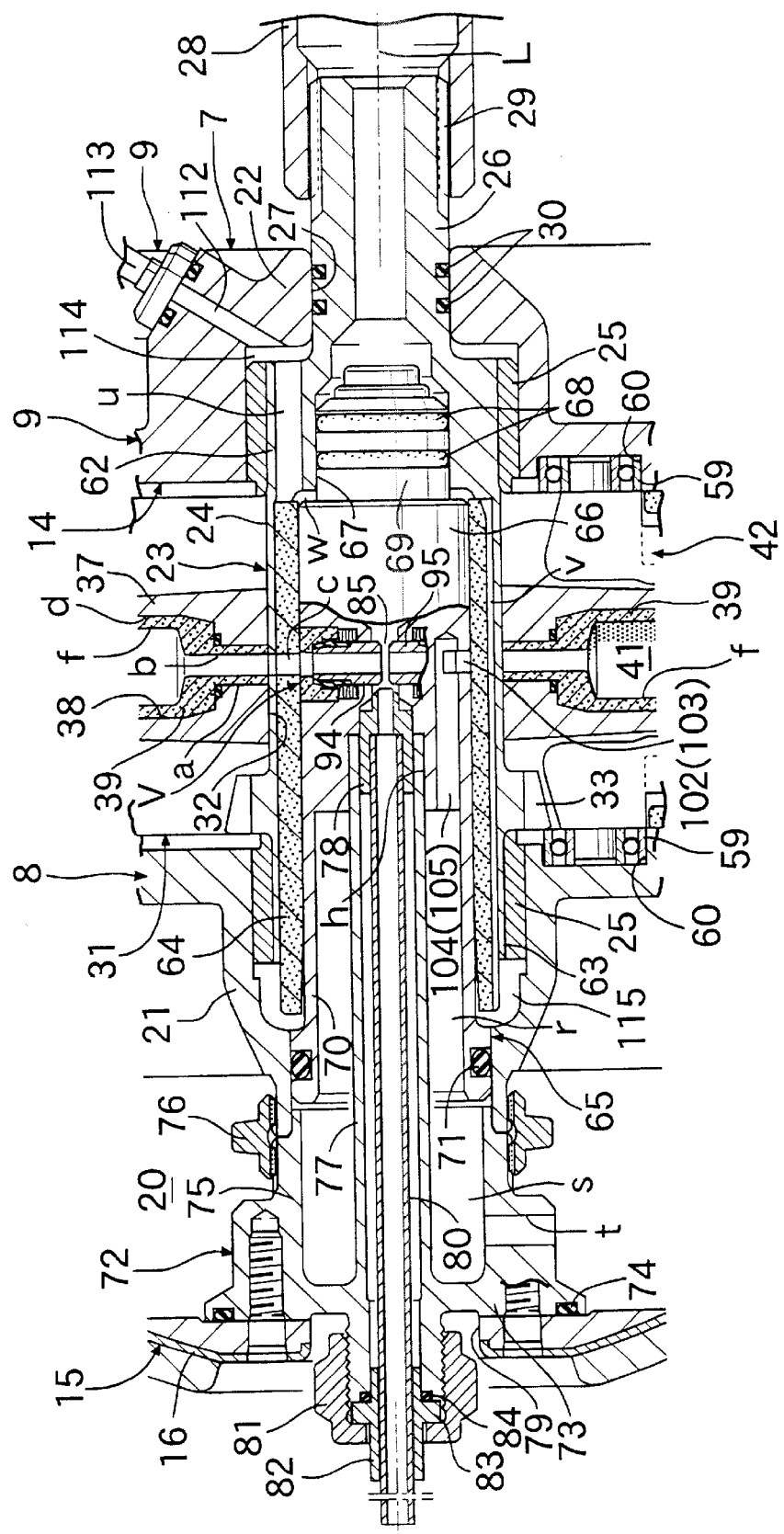

In FIGS. 2, 3, the large diameter portion 24 of the output shaft 23 has a thick portion 62 supported by the bearing metal 25 of the second half body 9 and a thin portion 63 extending from the thick portion 62 and supported by the bearing metal 25 of the first half body 8. In the thin portion 63, a hollow shaft 64 made of ceramic (or metal) is fitted so as to be rotated integrally with the output shaft 23. Inside the hollow shaft 64, a fixed shaft 65 is disposed, which comprises a large diameter solid portion 66 fitted to the hollow shaft 64 so as to be fitted in an axial thickness of the rotor 31, a small diameter solid portion 69 fitted to a hole 67 at the thick portion 62 of the output shaft 23 via two seal rings 68, and a thin hollow portion 70 extending from the large diameter solid portion 66 and fitted in the hollow shaft 64. A seal ring 71 is interposed between an end outer peripheral surface of the hollow portion 70 and the inner peripheral surface of the hollow shaft receiving tube 21 of the first half body 8.

The main body 16 of the shell-shaped member 15 is mounted, at its inner surface of the central portion, with an end wall 73 of a hollow tube 72 coaxial with the output shaft 23 via a seal ring 74. An inner end side of a short outer tube 75 extending inwardly from an outer peripheral portion of the end wall 73 is coupled with the hollow shaft receiving tube 21 of the first half body 8 via a coupling tube 76. On the end wall 73, an inner pipe 77 which has a small diameter and is long is provided so as to penetrate the same, and an inner end side of the inner pipe 77 is fitted to a stepped hole h at the large diameter solid portion 66 of the fixed shaft 65 together with a short hollow connection pipe 78 projecting therefrom. An outer end portion of the inner pipe 77 projects outwardly from a hole 79 of the shell-shaped member 15, and an inner end side of a first introduction pipe 80 for high temperature and high pressure vapor inserted from the outer end portion into the inner pipe 77 is fitted in the hollow connection pipe 78. A cap member 81 is screwed on the outer end portion of the inner pipe 77, and by the cap member 81, a flange 83 of a holder tube 82 for holding the introduction pipe 80 is fixed by pressure to the outer end surface of the inner pipe 77 via a seal ring 84.

As is shown in FIGS. 2 to 4, and 11, the large diameter solid portion 66 of the fixed shaft 65 is provided with a rotary valve V which supplies high temperature and high pressure vapor to the cylinder member 39 of the first to twelfth vane-piston units U1–U12 through a plurality of, in this embodiment twelve, through-holes c successively formed on the hollow shaft 64 and the output shaft 23, and exhausts first reduced temperature and reduced pressure vapor after expansion from the cylinder member 39 through the through-holes c, as follows.

Figure 11:
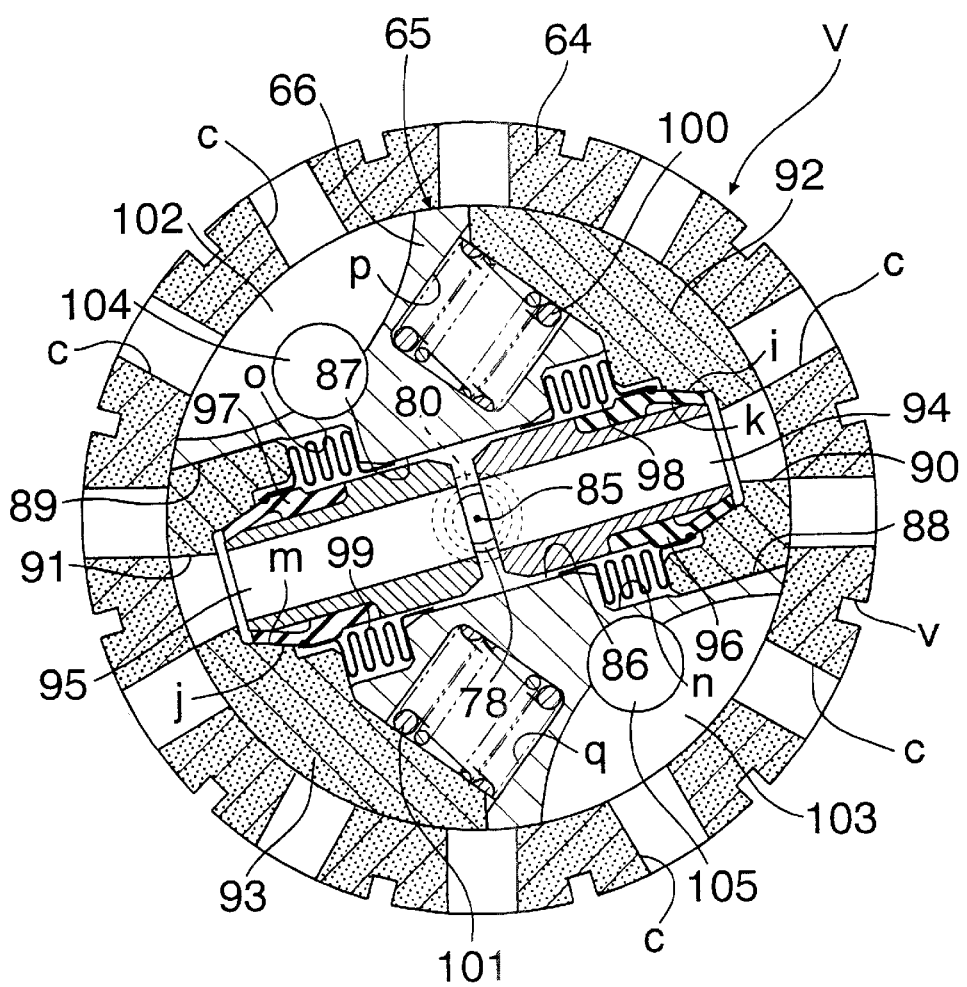

FIG. 11 shows a structure of the rotary valve V which supplies and exhausts the vapor to and from each cylinder member 39 of the expanding machine 4 with predetermined timing. In the large diameter solid portion 66, first and second holes 86, 87 extending in opposite directions to each other from a space 85 which communicates with the hollow connection pipe 78 are formed, and the first and second holes 86, 87 open into bottom surfaces of first and second recesses 88, 89 opening into the outer peripheral surface of the large diameter solid portion 66. First and second seal blocks 92, 93 made of carbon having supply ports 90, 91 are mounted with the first and second recesses 88, 89, and their outer peripheral surfaces are rubbed against the inner peripheral surface of the hollow shaft 64. In the first and second holes 86, 87, first and second supply pipes 94, 95 which are coaxial and short are inserted loosely, and taper outer peripheral surfaces i, j of first and second seal tubes 96, 97 fitted to tip side outer peripheral surfaces of the first and second supply pipes 94, 95 are fitted to inner peripheral surfaces of taper holes k, m inside the supply ports 90, 91 of the first and second seal blocks 92, 93 and connected thereto. The large diameter solid portion 66 is formed with first and second annular recesses n, o surrounding the first and second supply pipes 94, 95 and first and second blind-hole-shaped recesses p, q adjacent thereto so as to face the first and second seal blocks 92, 93, and in the first and second annular recesses n, o, first and second bellows-shaped elastic bodies 98, 99 with one end side fitted to the outer peripheral surfaces of the first and second seal tubes 96, 97 are accommodated, in the first and second blind-hole-shaped recesses p, q, first and second coil springs 100, 101 are fitted, and the first and second seal blocks 92, 93 are pressed against the inner peripheral surface of the hollow shaft 64 by spring forces of the first and second bellows-shaped elastic bodies 98, 99 and the first and second coil springs 100, 101.

In the large diameter solid portion 66, formed between the first coil spring 100 and the second bellows-shaped elastic body 99, and between the second coil spring 101 and the first bellows-shaped elastic body 98 are first and second recess-shaped exhaust portions 102, 103 always communicating with two through-holes c and first and second exhaust holes 104, 105 extending from the exhaust portions 102, 103 in parallel with the introduction pipe 80 and opening into a hollow portion r of the fixed shaft 65.

The members such as the first seal block 92 and second seal block 93 which are of the same kind and given a word "first" and a word "second" are in a point symmetrical relationship with respect to the axis of the fixed shaft 65.

There is a passage s of the first reduced temperature and reduced pressure vapor in the hollow portion r of the fixed shaft 65 and in the outer tube 75 of the hollow tube 72, and the passage s communicates with the junction chamber 20 via a plurality of through-holes t penetrating a peripheral wall of the outer tube 75.

As described above, the rotary valve V is disposed at the center of the expanding machine 4, and the high temperature and high pressure vapor supplied through the inside of the fixed shaft 65 disposed at the center of the rotary valve V is distributed to each cylinder member 39 concurrently with rotation of the rotor 31, which eliminates the need for intake and exhaust valves used in a general piston mechanisms to simplify the structure. Since the fixed shaft 65 and the hollow shaft 64 mutually slide at a small diameter portion with low peripheral velocity, the rotary valve V can have both sealing performance and wear resistance.

As shown in FIGS. 2 and 5, in the outer peripheral portion of the main body 11 of the first half body 8, formed around both ends of the short diameter of the rotor chamber 14 are first and second introduction hole groups 107, 108 formed of a plurality of introduction holes 106 aligned in the radial directions, and the first reduced temperature and reduced pressure vapor in the junction chamber 20 is introduced into the rotor chamber 14 via the introduction hole groups 107, 108. In the outer peripheral portion of the main body 11 of the second half body 9, formed between an end of the long diameter of the rotor chamber 14 and the second introduction hole group 108 is a first leading hole group 110 formed of a plurality of leading holes 109 aligned in the radial and peripheral directions, and formed between the other end of the long diameter and the first introduction hole group 107 is a second leading hole group 111 formed of a plurality of leading holes 109 aligned in the radial and peripheral directions. From the first and second leading hole groups 110, 111, second reduced temperature and reduced pressure vapor with further reduced temperature and pressure is exhausted outside by expansion between the adjacent vanes 42.

The output shaft 23 or the like is lubricated by water, and the lubricating passage is configured as follows. That is, as shown in FIGS. 2 and 3, a water supply pipe 113 is connected to a water supply hole 112 formed in the hollow shaft receiving tube 22 of the second half body 9. The water supply hole 112 communicates with a housing 114 which the bearing metal 25 of the second half body 9 side faces, the housing 114 communicates with a water passing hole u formed in the thick portion 62 of the output shaft 23, the water passing hole u communicates with a plurality of water passing grooves v extending in a generatrix direction of the outer peripheral surface of the hollow shaft 64 (see also FIG. 11), and further each water passing groove v communicates with a housing 115 which the bearing metal 25 of the second half body 8 side faces. An inner end surface of the thick portion 62 of the output shaft 23 is provided with an annular recess w which communicates the water passing hole u to a slide portion between the hollow shaft 64 and the large diameter solid portion 66 of the fixed shaft 65.

This causes lubrication between each bearing metal 25 and the output shaft 23, and between the hollow shaft 64 and fixed shaft 65 by water, and lubrication among the casing 7 and the seal member 44 and each roller 59 by water having permeated the rotor chamber 14 from the space between the bearing metals 25 and output shaft 23.

Figure 4:
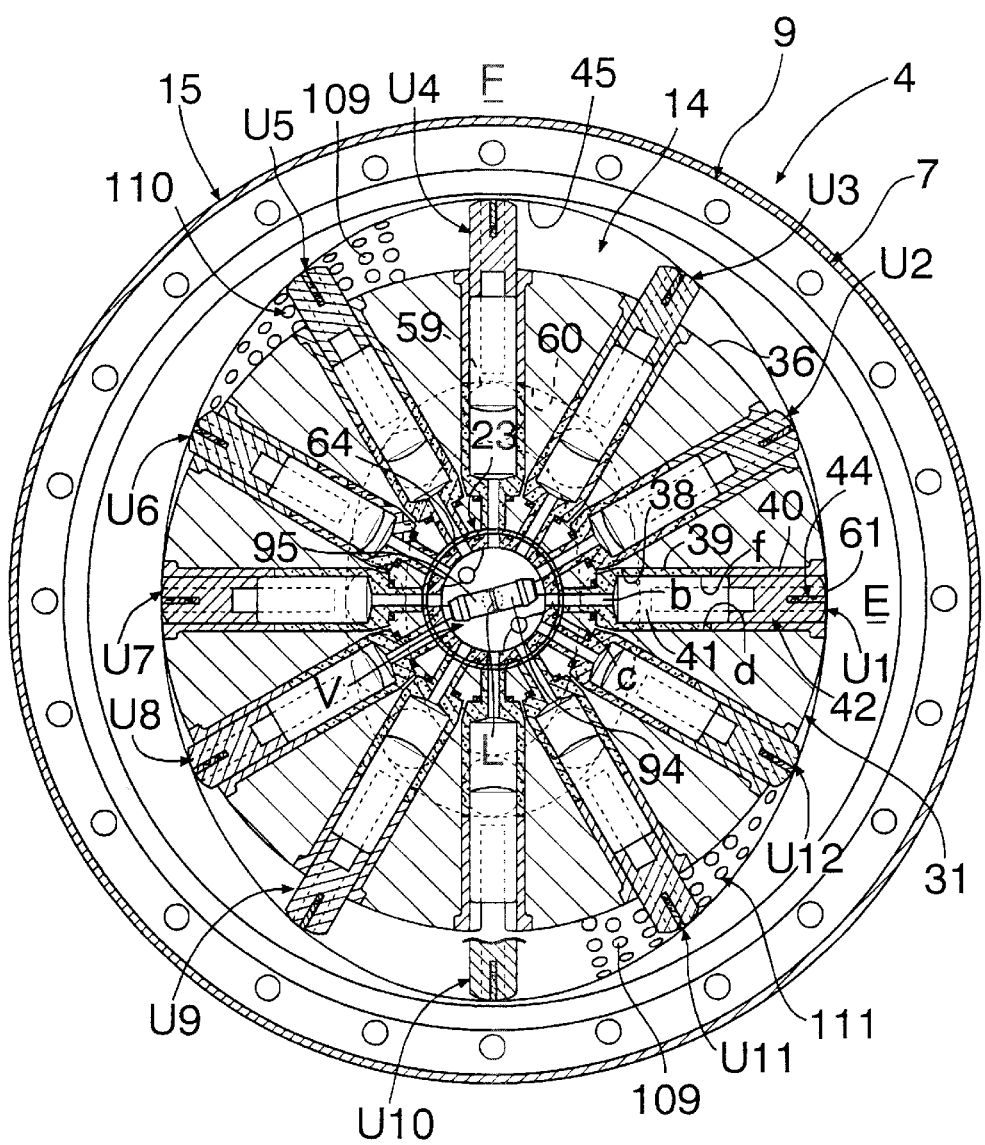

In FIG. 4, the first and seventh vane-piston units U1, U7 in a point symmetrical relationship with respect to the rotary axis L of the rotor 31 operate in the same way. This applies to the second and eighth vane-piston units U2, U8 and the like in the point symmetrical relationship.

For example, also referring to FIG. 11, an axis of a first supply pipe 94 is slightly shifted in a counterclockwise direction with respect to a short diameter position E of the rotor chamber 14 in FIG. 4, the first vane-piston unit U1 is located in the short diameter position E and the high temperature and high pressure vapor is not supplied to the large diameter cylinder hole f, and therefore it is assumed that the piston 41 and vane 42 are located in a backward position.

From this condition, the rotor 31 is slightly rotated in the counterclockwise direction in FIG. 4, the supply port 90 of the first seal block 92 communicates with the through-hole c, and the high temperature and high pressure vapor from the introduction pipe 80 is introduced in the large diameter cylinder hole f through a small diameter hole b. This causes forward motion of the piston 41, and since the vane 42 slides toward the long diameter position F of the rotor chamber 14, the forward motion is converted to rotary motion of the rotor 31 by engagement between the annular groove 60 and the roller 59 integral with the vane 42 via the vane 42. When the through-hole c is shifted from the supply port 90, the high temperature and high pressure vapor expands in the large diameter cylinder hole f to further move forward the piston 41, and thus the rotation of the rotor 31 is continued. The expansion of the high temperature and high pressure vapor ends when the first vane-piston unit U1 reaches the long diameter position F of the rotor chamber 14. Then, by the piston 41 moved backward by the vane 42, the first reduced temperature and reduced pressure vapor in the large diameter cylinder hole f is exhausted to the junction chamber 20 through a small diameter hole b, through-hole c, first recess-shaped exhaust portion 102, first exhaust hole 104, passage s (see FIG. 3), and each through-hole t with the rotation of the rotor 31, and is then introduced in the rotor chamber 14 through the first introduction hole group 107, as shown in FIGS. 2 and 5, and further expands between the adjacent vanes 42 to rotate the rotor 31, and then the second reduced temperature and reduced pressure vapor is exhausted outwards from the first leading hole group 110.

In this way, by operating the piston 41 by the expansion of the high temperature and high pressure vapor to rotate the rotor 31 via the vane 42, and by rotating the rotor 31 via the vane 42 by the expansion of the reduced temperature and reduced pressure vapor caused by a pressure reduction in the high temperature and high pressure vapor, an output can be obtained by the output shaft 23.

As a configuration for converting the forward motion of the piston 41 to the rotary motion of the rotor 31 other than the embodiment, the forward motion of the piston 41 may be received directly by the roller 59 without the vane 42, and converted to the rotary motion by the engagement with the annular groove 60. The vane 42 may be always spaced apart at a substantially constant interval from the inner peripheral surface 45 and the opposed inner end surfaces 47 of the rotor chamber 14 by the cooperation of the roller 59 and the annular groove 60, as described above, and the piston 41 and roller 59, and the vane 42 and roller 59, respectively may especially cooperate with the annular groove 60.

When using the expanding machine 4 as a compressing machine, the rotor 31 is rotated in a clockwise direction in FIG. 4 by the output shaft 23, outside air as fluid is sucked from the first and second leading hole groups 110, 111 into the rotor chamber 14 by the vane 42, and low pressure air thus obtained is supplied from the first and second introduction hole groups 107, 108 to the large diameter cylinder hole f through the junction chamber 20, each through-hole t, passage s, first and second exhaust holes 104, 105, first and second recess-shaped exhaust portions 102, 103, and through-hole c, and the piston 41 is operated by the vane 42 to convert the low pressure air to high pressure air, and the high pressure air is introduced in the introduction pipe 80 through the through-hole c, the supply ports 90, 91 and the first and second supply pipes 94, 95.

Using the above-described various components, a vane type fluid machine, for example, a vane pump, vane motor, fan, vane compressing machine, or the like can be formed as clearly shown by FIG. 5. That is, the vane type fluid machine comprises the casing 7 having the rotor chamber 14, the rotor 31 accommodated in the rotor chamber 14 and a plurality of vanes 42 which are radially disposed in the rotor 31 around the rotary axis L thereof and is freely reciprocated in the respective radial directions, and the section B of the rotor chamber 14 in the phantom plane A including the rotary axis L of the rotor 31 is formed of a pair of semi-circular sections B1 with their diameters g opposed to each other, and a rectangular section B2 formed by connecting opposed one ends of both the diameters g to each other and opposed other ends of the diameters to each other, respectively, and each vane 42 comprises the vane body 43 and the seal member 44 which is mounted on the vane body 43 and pressed against the rotor chamber 14 by a spring force, centrifugal force and vapor force, and the seal member 44 has the semi-circular arcuate portion 55 sliding on the inner peripheral surface 45 by the semi-circular section B1 of the rotor chamber 14 and a pair of parallel portions 56 sliding on the opposed inner end surfaces 47 by the rectangular section B2. In this case, each vane body 43 has a pair of parallel portions 48 corresponding to both the parallel portions 56 of the seal member 44, and the rollers 59 provided in the parallel portions 48 are respectively placed in rotatable engagement with both the annular grooves 60 formed on the opposite inner end surfaces 47 of the casing 7 in order that a tip end surface of each vane body 43 is always spaced apart from the inner peripheral surface 45 of the rotor chamber 14.

Therefore, a seal action between the vane body 43 and the inner peripheral surface of the rotor chamber 14 is generated by the spring force of the seal member 44 per se, centrifugal force exerted on the seal member 44 per se and vapor pressure which vapor permeating the U-shaped groove 52 of the vane body 43, from the rotor chamber 14 on high pressure side pushes up the seal member 44. In this way, the seal action is not influenced by excessive centrifugal force exerted on the vane body 43 depending on the number of rotation of the rotor 31, so that seal surface pressure can have both good sealing performance and a low friction property independent of the centrifugal force exerted on the vane body 43.

It should be noted here that each machine disclosed in the Japanese Patent Application Laid-open No. 59-41602 and the Japanese Patent Application Laid-open No. 60-206990 comprises a plurality of vane type rotary machines disposed inside and outside in the radial directions, and the vane type rotary machine has a simple structure of a conversion mechanism between pressure energy and mechanical energy and can deal with a large flow amount of working fluid with a compact structure, while there is a problem that a large leak amount of the working fluid from a slide portion of the vane makes it difficult to increase efficiency.

A radial plunger pump disclosed in the Japanese Patent Application Laid-open No. 64-29676 has high sealing performance of a working fluid because the working fluid is compressed by a piston slidably fitted to the cylinder, and can minimize an efficiency reduction due to a leak even when using a high pressure working fluid, while there is a problem that a crank mechanism or a slanting mechanism for converting reciprocating motion of the piston to rotary motion is required, which makes the structure complex.

Therefore, it is desirable to make a rotary type fluid machine have merits belonging to the piston type and merits belonging to the vane type.

For this reason, in the above-described expanding machine 4, a first energy converting means including the cylinder member 39 and piston 41 and a second energy converting means including the vane 42 are provided in the common rotor 31 and the high temperature and high pressure vapor energy is extracted in the output shaft 23 as mechanical energy by cooperation of the first and second energy converting means connected in series. Thus, the mechanical energy output by the first energy converting means and the mechanical energy output by the second energy converting means can be automatically integrated via the rotor 31, which eliminates the need for special energy integrating means having power transmitting means such as a gear.

The first energy converting means includes a combination of the cylinder 39 piston 41 which can easily seal a working fluid and rarely causes a leak, thereby increasing the sealing performance of the high temperature and high pressure vapor to permit minimizing an efficiency reduction due to a leak. On the other hand, the second energy converting means includes the vane 42 supported by the rotor 31 movably in a radial direction, so that the vapor pressure exerted on the vane 42 is directly converted to rotary motion of the rotor 31, which eliminates the need for a special conversion mechanism for converting the reciprocating motion to rotary motion to simplify the structure. Further, the second energy converting means which can effectively convert vapor with low pressure and a large amount of flow to mechanical energy is disposed so as to surround an outer periphery of the first energy converting means, which permits making the whole expanding machine 4 compact.

The first energy converting means including the cylinder 39 and piston 41 has a feature of high converting efficiency between the pressure energy and mechanical energy when the high temperature and high pressure vapor is the working fluid, and the second energy converting means including the vane 42 has a feature of high converting efficiency between the pressure energy and mechanical energy even when relatively low temperature and low pressure vapor is the working fluid. Thus, the first and second energy converting means are connected in series, the high temperature and high pressure vapor is first passed through the first energy converting means to be converted to the mechanical energy, first reduced temperature and reduced pressure vapor with the resultant reduced pressure is passed through the second energy converting means to be converted again to the mechanical energy, thereby allowing the energy contained in the original high temperature and high pressure vapor to be fully and effectively converted to the mechanical energy.

Meanwhile, even when the expanding machine 4 of this embodiment is used as a compressing machine, air sucked into the rotor chamber 14 by rotating the rotor 31 with external mechanical energy is compressed by the second energy converting means which effectively operates by a relatively low temperature and low pressure working fluid to have elevated temperature, and the compressed and temperature elevated air is further compressed by the first energy converting means which effectively operates by a relatively high temperature and high pressure working fluid to have elevated temperature, thereby permitting efficient conversion of the mechanical energy to the pressure energy (heat energy) of compressed air. Thus, by a combination of the first energy converting means including the cylinder 39 and piston 41 with the second energy converting means including the vane 42, a high performance rotary type fluid machine having both features can be obtained.

The rotary axis L of the rotor 31 (that is, the rotary axis L of the output shaft 23) matches the center of the rotor chamber 14, and when the rotor 31 is divided into four by 90° in every direction in FIGS. 4 and 5, the pressure energy is converted to the mechanical energy in an upper right quarter part and a lower left quarter part point-symmetrical with respect to the rotary axis L, thereby preventing an offset load from being exerted on the rotor 31 to restrain occurrence of vibration. That is, a part where the pressure energy of the working fluid is converted to the mechanical energy, or a part where the mechanical energy is converted to the pressure energy of the working fluid is disposed at two positions which are shifted by 180° around the rotary axis L of the rotor 31, so that the load applied to the rotor 31 becomes couple to permit smooth rotation and increased efficiency of intake timing and exhaust timing.

That is, in the rotary type fluid machine which includes at least first and second energy converting means, which can function as an expanding machine for integrating and outputting mechanical energy generated by the first and second energy converting means, respectively, by inputting the working fluid having pressure energy in the first and second energy converting means to convert the pressure energy to mechanical energy, and can function as a compressing machine for integrating and outputting pressure energy of the working fluid generated by the first and second energy converting means, respectively, by inputting the mechanical energy in the first and second energy converting means to convert the mechanical energy to pressure energy of the working fluid, the first energy converting means includes a cylinder radially formed in a rotor rotatably accommodated in a rotor chamber and a piston sliding in the cylinder, and the second energy converting means includes a vane which radially moves into and out of the rotor and has its outer peripheral surface in slidable contact with an inner peripheral surface of the rotor chamber.

With the above-described first arrangement, the first energy converting means includes the cylinder radially formed in the rotor rotatably accommodated in the rotor chamber and the piston sliding in the cylinder, which permits increasing sealing performance of a high pressure working fluid to minimize an efficiency reduction due to a leak. Further, the second energy converting means includes the vane which is supported movably in a radial direction by the rotor and makes slidable contact with the inner peripheral surface of the rotor chamber, and thereby has a simple structure of a conversion mechanism between the pressure energy and mechanical energy and can deal with a large flow amount of working fluid with a compact structure. Thus, by the combination of the first energy converting means including the piston and cylinder with the second energy converting means including the vane, a high performance rotary type fluid machine having both features can be obtained.

In addition to the first arrangement, the first energy converting means converts between reciprocating motion of the piston and rotary motion of the rotary shaft and the second energy converting means converts between circumferential movement of the vane and the rotary motion of the rotary shaft.

With the above-described second arrangement, the first energy converting means converts between reciprocating motion of the piston and rotary motion of the rotary shaft and the second energy converting means converts between circumferential movement of the vane and the rotary motion of the rotary shaft, so that a fluid can be compressed by the first and second energy converting means by inputting an external force from the rotary shaft, and the rotary shaft can be driven by the first and second energy converting means by supplying a high pressure fluid. This allows the mechanical energy to be integrated and output by the first and second energy converting means, or allows the pressure energy of the working fluid to be integrated and output by the first and second energy converting means.

In addition to the second arrangement, the rotary shaft supports the rotor.

With the above-described third arrangement, the rotor is supported by the rotary shaft, so that the mechanical energy generated by the piston, cylinder or vane provided in the rotor can be efficiently output in the rotary shaft and that the working fluid can be efficiently compressed by the piston, cylinder or vane provided in the rotor supported by the rotary shaft, simply by inputting the mechanical energy in the rotary shaft.

In addition to the first arrangement, when functioning as the expanding machine, the whole amount of the working fluid having passed through the first energy converting means passes through the second energy converting means, and when functioning as the compressing machine, the whole amount of the working fluid having passed through the second energy converting means passes through the first energy converting means.

With the above-described fourth arrangement, the first and second energy converting means are connected in series, and when functioning as the expanding machine, the high pressure working fluid is first passed through the first energy converting means to convert part of the pressure energy to the mechanical energy, and the resultant reduced pressure working fluid is further passed through the second energy converting means to convert balance of the pressure energy to the mechanical energy, thereby permitting efficient conversion of the pressure energy of the working fluid to the mechanical energy. On the other hand, when functioning as the compressing machine, the rotary shaft is rotated by the mechanical energy to compress the working fluid by the second energy converting means, and the compressed working fluid is further compressed by the first energy converting means, thereby permitting efficient conversion of the mechanical energy to the pressure energy of the working fluid.

In addition to the first arrangement, when functioning as the expanding machine, the pressure energy of the working fluid is converted to the mechanical energy at two positions where the phases of the rotor are shifted by 180°, and when functioning as the compressing machine, the mechanical energy is converted to the pressure energy of the working fluid at two positions where the phases of the rotor are shifted by 180°.

With the above-described fifth arrangement, the part where the pressure energy of the working fluid is converted to the mechanical energy, or the part where the mechanical energy is converted to the pressure energy of the working fluid are disposed at two positions where the phases of the rotor are shifted by 180°, so that the load exerted on the rotor becomes couple to permit smooth rotation of the rotor and increased efficiency of intake timing and exhaust timing.

Disclosed in the Japanese Patent Application Laid-open No. 59-41602 and the Japanese Patent Application Laid-open No. 60-206990 are machines where in a vane is circumferentially pressed by pressure of a high pressure fluid to rotatably drive a rotor, or the rotor is rotatably driven by an external force to compress the fluid by the vane, but in a machine which includes a piston slidably fitted to a cylinder radially provided in the rotor other than the vane, and carries out conversion of mechanical energy to pressure energy of a working fluid by the piston associating with the vane and reciprocating in the cylinder, there is a problem that a mechanism (for example, a crank mechanism or a slanting mechanism) for converting the reciprocating motion of the piston to the rotary motion of the rotor is required, which makes the structure of the entire device complex and thereby causes increased size and increased weight.

Disclosed in the Japanese Patent Application Laid-open No. 57-16293 is a machine wherein a roller provided in an intermediate portion of each vane is guided in engagement with a roller track provided in a casing, but the vane simply generates a circumferential load and does not generate a radial load, so that engagement between the roller and the roller track does not contribute to conversion between the mechanical energy and pressure energy of the working fluid.

Disclosed in the Japanese Patent Application Laid-open No. 64-29676 is a radial plunger pump, and a rotor is disposed in an offset manner in a circular cam ring, so that there is a problem that an offset load is applied to the rotary shaft to cause vibration.

Thus, in the rotary type fluid machine including the piston and vane which are provided in the rotor and move integrally, it is desirable that conversion between the mechanical energy and pressure energy of the working fluid be smoothly carried out with a simple structure and that a clearance between the outer peripheral surface of the vane and the inner peripheral surface of the rotor chamber be appropriately controlled.

For this reason, in the above-described expanding machine 4, the first energy converting means including the cylinder member 39 and the piston 41 and the second energy converting means including the vane 42 are provided in the common rotor 31 and the high temperature and high pressure vapor energy is extracted in the output shaft 23 as the mechanical energy by cooperation of the first and second energy converting means. In the first energy converting means including the cylinder member 39 and the piston 41, the roller 59 provided in vane-piston units U1–U12 radially reciprocated by the piston 41 rotatably engage the substantially oval annular groove 60 provided in the first and second half bodies 8, 9. Therefore, the reciprocating motion of the piston 41, that is, the reciprocating motion of the vane-piston units U1–U12 is converted to the rotary motion of the rotor 31 via the roller 59 and the annular groove 60. Such use of the roller 59 and annular groove 60 eliminates the need for the complex and large crank mechanism or slanting mechanism for converting the reciprocating motion to the rotary motion, which permits simplifying the structure of the expanding machine 4 so as to be compact and minimizing energy loss due to friction.

The second energy converting means formed of the vane 42 has an extremely simple structure which receives pressure of first reduced temperature and reduced pressure vapor whose temperature and pressure are reduced by the first energy converting means to rotate the rotor 31, but can efficiently deal with a large flow amount of vapor. By integrating and outputting the mechanical energy output by the first energy converting means operated by the high temperature and high pressure vapor, and the mechanical energy output by the second energy converting means operated by the first reduced temperature and reduced pressure vapor, the original energy of the high temperature and high pressure vapor can be fully utilized to permit increasing energy converting efficiency of the expanding machine 4.

When the vane-piston units U1–U12 reciprocate in a radial direction with respect to the rotor 31, guiding the roller 59 provided in the vane-piston units U1–U12 by the annular groove 60 permits ensuring a constant clearance between the outer peripheral surface of the vane 42 and the inner peripheral surface of the rotor chamber 14. Further, a seal action between the vane body 43 and the inner peripheral surface of the rotor chamber 14 is generated by the spring force of the seal member 44 per se, centrifugal force applied to the seal member 44 per se and vapor pressure with which vapor permeating the U-shaped groove 52 of the vane body 43 from the rotor chamber 14 on high pressure side pushes up the seal member 44. Therefore, the seal action is not influenced by excessive centrifugal force applied to the vane body 43 depending on the number of rotation of the rotor 31, so that good sealing performance can be compatible with a low friction property, thereby preventing occurrence of abnormal friction and occurrence of friction loss due to excessive surface pressure by the centrifugal force by the vane body 43 between the vane 42 and rotor chamber 14, and minimizing occurrence of a leak of vapor from the clearance between the vane 42 and rotor chamber 14.

The rotary axis L of the rotor 31 (that is, the rotary axis L of the output shaft 23) matches the center of the rotor chamber 14, and when the rotor 31 is divided into four by 90° in every direction in FIGS. 4 and 5, the pressure energy is converted to the mechanical energy in an upper right quarter part and a lower left quarter part point-symmetrical with respect to the rotary axis L, thereby preventing an offset load from being applied to the rotor 31 to restrain occurrence of vibration.

That is, in the rotary type fluid machine which includes at least first and second energy converting means, and can function as an expanding machine for integrating and outputting mechanical energy generated by first and second energy converting means, respectively, by inputting the working fluid having pressure energy in the first and second energy converting means to convert the pressure energy to mechanical energy, and can function as a compressing machine for integrating and outputting pressure energy of the working fluid generated by first and second energy converting means, respectively, by inputting the mechanical energy in the first and second energy converting means to convert the mechanical energy to pressure energy of the working fluid, the first energy converting means including a cylinder radially formed in a rotor rotatably accommodated in a rotor chamber and a piston sliding in the cylinder, and the second energy converting means including a vane which radially moves into and out of the rotor and has its outer peripheral surface in slidable contact with an inner peripheral surface of the rotor chamber, a roller associating with at least the piston is provided, and by placing the roller in engagement with a non-circular annular groove formed in a casing comparting the rotor chamber, the reciprocating motion of the piston and rotary motion of the rotor are mutually converted.

With the above-described sixth arrangement, the roller associating with the piston moving in the radial direction with respect to at least the rotor rotating in the rotor chamber is provided, and the roller is placed in engagement with the non-circular annular groove formed in the casing comparting the rotor chamber, so that when functioning as the expanding machine, the reciprocating motion of the piston can be converted to the rotary motion of the rotor, and when functioning as the compressing machine, the rotary motion of the rotor can be converted to the reciprocating motion of the piston, with a simple structure including the roller and annular groove.

In the rotary type fluid machine which includes at least first and second energy converting means, and can function as an expanding machine for integrating and outputting mechanical energy generated by first and second energy converting means, respectively, by inputting the working fluid having pressure energy in the first and second energy converting means to convert the pressure energy to mechanical energy, and which can function as a compressing machine for integrating and outputting pressure energy of the working fluid generated by first and second energy converting means, respectively, by inputting the mechanical energy in the first and second energy converting means to convert the mechanical energy to pressure energy of the working fluid, the first energy converting means including a cylinder radially formed in a rotor rotatably accommodated in a rotor chamber and a piston sliding in the cylinder, and the second energy converting means including a vane which radially moves into and out of the rotor and has its outer peripheral surface in slidable contact with an inner peripheral surface of the rotor chamber, a roller associating with at least the vane is provided, and by placing the roller in engagement with a non-circular annular groove formed in a casing comparting the rotor chamber, a clearance between the outer peripheral surface of the vane and the inner peripheral surface of the rotor chamber is regulated.

With the above-described seventh arrangement, the roller associating with the vane moving in a radial direction with respect to at least the rotor rotating in the rotor chamber is provided, and the roller is placed in engagement with the non-circular annular groove formed in the casing comparting the rotor chamber, so that guiding a moving track of the roller with the annular groove can regulate the clearance between the outer peripheral surface of the vane and the inner peripheral surface of the rotor chamber to prevent occurrence of abnormal friction and a leak.

In the rotary type fluid machine which includes at least first and second energy converting means, and can function as an expanding machine for integrating and outputting mechanical energy generated by first and second energy converting means, respectively, by inputting the working fluid having pressure energy in the first and second energy converting means to convert the pressure energy to mechanical energy, and can function as a compressing machine for integrating and outputting pressure energy of the working fluid generated by first and second energy converting means, respectively, by inputting the mechanical energy in the first and second energy converting means to convert the mechanical energy to pressure energy of the working fluid, the first energy converting means including a cylinder radially formed in a rotor rotatably accommodated in a rotor chamber and a piston sliding in the cylinder, and the second energy converting means including a vane which radially moves into and out of the rotor and has its outer peripheral surface in slidable contact with an inner peripheral surface of the rotor chamber, a roller associating with at least the vane and piston is provided, and by placing the roller in engagement with a non-circular annular groove formed in a casing comparting the rotor chamber, reciprocating motion of the piston and rotary motion of the rotor are mutually converted and a clearance between the outer peripheral surface of the vane and the inner peripheral surface of the rotor chamber is regulated.

With the above-described eighth arrangement, the roller associating with the vane and piston moving in a radial direction with respect to at least the rotor rotating in the rotor chamber is provided, and the roller is placed in engagement with the non-circular annular groove formed in the casing comparting the rotor chamber, so that when functioning as the expanding machine, the reciprocating motion of the piston can be converted to the rotary motion of the rotor, and when functioning as the compressing machine, the rotary motion of the rotor can be converted to the reciprocating motion of the piston with a simple structure including the roller and annular groove. Further, guiding a moving track of the roller with the annular groove can regulate the clearance between the outer peripheral surface of the vane and the inner peripheral surface of the rotor chamber to prevent occurrence of abnormal friction and a leak.

In addition to any one of the above-described sixth to eighth arrangement, the rotary shaft of the rotor is matched to the center of the rotor chamber.

With the above-described ninth arrangement, the rotary shaft of the rotor matches the center of the rotor chamber, which permits preventing an offset load from being applied to the rotor to restrain occurrence of vibration with the rotation of the rotor.

It should be noted here that temperature and pressure of the high temperature of high pressure vapor supplied to the vane type rotary machine which functions as the expanding machine are reduced concurrently with the pressure energy (heat energy) being converted to the mechanical energy by the vane. On the other hand, in the vane type rotary machine which functions as the compressing machine, temperature and pressure of the working fluid compressed by the vane driven by the mechanical energy are gradually increased.

Thus, when a low pressure working fluid is supplied to the inner rotary machine, and a high pressure working fluid is supplied to the outer rotary machine in the case where a plurality of rotary machine are disposed inside and outside in the radial direction, there is a problem that the pressure of the working fluid is wasted since the high pressure working fluid tends to leak out of the casing. When a low temperature working fluid is supplied to the inner rotary machine, and a high temperature working fluid is supplied to the outer rotary machine in the case of where the plurality of rotary machine are disposed inside and outside in the radial direction, there is a problem that heat efficiency is reduced since the heat of the working fluid tends to leak out of the casing.

Therefore, in the rotary type fluid machine which has at least first and second energy converting means disposed inside and outside in the radial direction, it is desirable to minimize the leak of the heat and pressure of the working fluid to increase efficiency of the rotary type fluid machine.

For this reason, in the above-described expanding machine 4, the first energy converting means including the cylinder member 39 and piston 41 is disposed on the central side of the rotor chamber 14 and the second energy converting means including the vane 42 is disposed outside in the radial direction so as to surround the first energy converting means. Thus, the high temperature and high pressure vapor is first supplied to the first energy converting means (the cylinder member 39 and the piston 41) on the central side, where the first reduced temperature and reduced pressure vapor after converted to the mechanical energy is supplied to the second energy converting means (the vane 42) on the outer peripheral side. In this way, in the case where the first and second energy converting means are disposed inside and outside in the radial direction, the high temperature and high pressure vapor is supplied to the inner first energy converting means and the reduced temperature and reduced pressure vapor is supplied to the outer second energy converting means, whereby the pressure and heat of the high temperature and high pressure vapor leaked from the inner first energy converting means can be captured and recovered by the outer second energy converting means to increase efficiency of the whole expanding machine 4 by utilizing the leaked high temperature and high pressure vapor without waste. Further, the second energy converting means to which the first reduced temperature and reduced pressure vapor whose pressure and temperature are relatively low is supplied is disposed on the outer peripheral side of the rotor chamber 14, thereby facilitating not only a seal for preventing a leak of the working fluid from the rotor chamber 14 but also heat insulation for preventing an outward leak of the heat from the rotor chamber 14.

Meanwhile, when the rotary type fluid machine according to the present invention is used as a compressing machine, compressed air which is compressed by undergoing a first stage compression by the vane 42 which is the outer second energy converting means raises its pressure and temperature, and the compressed air undergoes a second stage compression by the cylinder means 39 and the piston 41 which are the inner first energy converting means to further raise its pressure and temperature. Thus, even when the rotary type fluid machine is used as the compressing machine, the pressure and heat of the high temperature and high pressure compressed air leaked from the inner first energy converting means can be captured and recovered by the outer second energy converting means to not only permit increasing efficiency of the whole compressing machine but also facilitate a seal for preventing an outward leak of the compressed air from the rotor chamber 14 and heat insulation for preventing an outward leak of the heat from the rotor chamber 14.

That is, in the rotary type fluid machine which includes at least first and second energy converting means, and can function as an expanding machine for integrating and outputting mechanical energy generated by first and second energy converting means, respectively, by inputting the working fluid having pressure energy in the first and second energy converting means to convert the pressure energy to mechanical energy, and can function as a compressing machine for integrating and outputting pressure energy of the working fluid generated by first and second energy converting means, respectively, by inputting the mechanical energy in the first and second energy converting means to convert the mechanical energy to pressure energy of the working fluid, the high pressure working fluid is disposed on the central side of the rotor chamber which rotatably accommodates the rotor including the first and second energy converting means and the low pressure working fluid is disposed on the outer peripheral side of the rotor chamber.

With the above-described tenth arrangement, the high pressure working fluid and low pressure working fluids are respectively disposed on the central side and outer peripheral side of the rotor chamber which rotatably accommodates the rotor, whereby the high pressure working fluid leaked from the central side of the rotor chamber can be captured and recovered by the low pressure working fluid on the outer peripheral side of the rotor chamber to increase efficiency of the whole rotary type fluid machine by utilizing the leaked high temperature working fluid without waste and to facilitate a seal for preventing an outward leak of the working fluid from the rotor chamber.

In the rotary type fluid machine which includes at least first and second energy converting means, and can function as an expanding machine for integrating and outputting mechanical energy generated by first and second energy converting means, respectively, by inputting the working fluid having pressure energy in the first and second energy converting means to convert the pressure energy to mechanical energy, and can function as a compressing machine for integrating and outputting pressure energy of the working fluid generated by first and second energy converting means, respectively, by inputting the mechanical energy in the first and second energy converting means to convert the mechanical energy to pressure energy of the working fluid, the high temperature working fluid is disposed on the central side of the rotor chamber which rotatably accommodates the rotor including the first and second energy converting means and the low temperature working fluid is disposed on the outer peripheral surface of the rotor chamber.

With the above-described eleventh arrangement, the high temperature and low temperature working fluids are respectively disposed on the central side and outer peripheral side of the rotor chamber which rotatably accommodates the rotor, whereby the high temperature working fluid leaked from the central side of the rotor chamber can be captured and recovered by the low temperature working fluid on the outer peripheral side of the rotor chamber to increase efficiency of the whole rotary type fluid machine by utilizing the leaked high temperature working fluid without waste and to facilitate heat insulation for preventing an outward leak of the heat from the rotor chamber.

Further, in the rotary type fluid machine which includes at least first and second energy converting means, and can function as an expanding machine for integrating and outputting mechanical energy generated by first and second energy converting means, respectively, by inputting the working fluid having pressure energy in the first and second energy converting means to convert the pressure energy to mechanical energy, and can function as a compressing machine for integrating and outputting pressure energy of the working fluid generated by first and second energy converting means, respectively, by inputting the mechanical energy in the first and second energy converting means to convert the mechanical energy to pressure energy of the working fluid, the high pressure and high temperature working fluid is disposed on the central side of the rotor chamber which rotatably accommodates the rotor including the first and second energy converting means and the low pressure and low temperature working fluid is disposed on the outer peripheral surface of the rotor chamber.

With the above-described twelfth arrangement, the high pressure and high temperature working fluid and the low pressure and low temperature working fluid are respectively disposed on the central side and outer peripheral side of the rotor chamber which rotatably accommodates the rotor, whereby the high pressure and high temperature working fluid leaked from the central side of the rotor chamber can be captured and recovered by the low pressure and low temperature working fluid on the outer peripheral side of the rotor chamber to increase efficiency of the whole rotary type fluid machine by utilizing the leaked high pressure and high temperature working fluid without waste. Moreover, the low pressure and low temperature working fluid is disposed on the outer peripheral surface of the rotor chamber, thereby facilitating a seal for preventing an outward leak of the working fluid from the rotor chamber, and heat insulation for preventing an outward leak of the heat from the rotor chamber.

In addition to any one of the above-described tenth to twelfth arrangements, the first energy converting means includes a cylinder radially formed in the rotor rotatably accommodated in the rotor chamber and a piston sliding in the cylinder, and the second energy converting means includes a vane which radially moves into and out of the rotor and has its outer peripheral surface in slidable contact with an inner peripheral surface of the rotor chamber.

With the above-described thirteenth arrangement, the first energy converting means includes the cylinder radially formed in the rotor rotatably accommodated in the rotor chamber and a piston sliding in the cylinder, whereby sealing performance of the high pressure working fluid can be increase to minimize an efficiency reduction due to a leak, and the second energy converting means includes a vane which is supported by the rotor movably in a radial direction and is slidable contact with the inner periphery of the rotor chamber, whereby a structure of a conversion mechanism between the pressure energy and mechanical energy can be simplified to permit dealing with a large flow amount of working fluid with a compact structure. Thus, by the combination of the first energy converting means including the piston and the cylinder with the second energy converting means including the vane, a high performance rotary type fluid machine having both features can be obtained.

It should be noted here that disclosed in the Japanese Patent Application Laid-open No. 58-48076 is an apparatus using a simple vane motor as an expanding machine, so that there is a problem that it is difficult to efficiently convert high temperature and high pressure vapor energy generated by an evaporating machine to mechanical energy by the expanding machine.

Thus, it is desirable to increase efficiency of the expanding machine of a Rankine cycle apparatus and to efficiently convert the high temperature and high pressure vapor energy to mechanical energy.

In this embodiment described above, in a Rankine cycle comprising the evaporating machine 3 for heating water by heat energy of exhaust gas of the internal combustion engine 1 to generate high temperature and high pressure vapor, the expanding machine 4 for converting the high temperature and high pressure vapor supplied from the evaporating machine 3 to a shaft output with the constant torque, a condensing machine 5 for liquefying reduced temperature and reduced pressure vapor exhausted from the expanding machine 4, and the supply pump 6 for supplying water liquefied by the condensing machine 5 to the evaporating machine 3, adopted as the expanding machine 4 is of the displacement type. The displacement type expanding machine 4 can recover energy with high efficiency in a wide range of the number of rotation from a low speed to high speed, and is also excellent in a following property and responsivity to change of the heat energy of the exhaust gas (changes of temperature and flow amount of the exhaust gas) depending on increase and decrease of the number of rotation of the internal combustion engine 1, compared with a non-displacement type expanding machine such as a turbine. Further, the expanding machine 4 is formed of the double expansion type where the first energy converting means including the cylinder member 39 and the piston 41 and the second energy converting means including the vane 42 are connected in series to be disposed inside and outside in the radial direction, so that recovery efficiency of the heat energy by the Rankine cycle can be further improved together with improvement in space efficiency by miniaturizing the expanding machine 4.

That is, in a rotary type fluid machine including a displacement type expanding machine which is provided in a Rankine cycle apparatus where pressure energy of high temperature and high pressure vapor generated by heating water with waste heat from prime motor is converted to the machine energy, and the resultant reduced temperature and reduced pressure vapor is condensed to be again heated by the waste heat, and converts pressure energy to mechanical energy, the expanding machine includes at least first and second energy converting means, and integrates and outputs mechanical energy generated by the first and second energy converting means, respectively, by inputting the pressure energy in the first and second energy converting means to convert the pressure energy to mechanical energy.

With the above-described fourteenth arrangement, in the Rankine cycle apparatus where the pressure energy of the high temperature and high pressure vapor generated by heating the water with the waste heat from the prime motor is converted to the mechanical energy, and the resultant reduced temperature and reduced pressure vapor is liquefied to be again heated by the waste heat, the expanding machine for converting the pressure energy to mechanical energy is formed of the displacement type, which makes it possible to increase efficiency of heat energy recovery of Rankine cycle by recovering energy with high efficiency in the wide range of the number of rotation from the low speed to high speed, and to be also excellent in the following property and responsivity to change of the energy of the waste heat depending on increase and decrease of the number of rotation of the prime motor, compared with a non-displacement type expanding machine such as a turbine. Further, the displacement type expanding machine integrates and outputs the output of the first energy converting means and the output of the second energy converting means, which permits not only converting the pressure energy of the high temperature and high pressure vapor to the mechanical energy without waste but also improving space efficiency by miniaturizing the expanding machine.

In addition to the above-described fourteenth arrangement, the first energy converting means includes the cylinder radially formed in the rotor rotatably accommodated in the rotor chamber and the piston sliding in the cylinder, and the second energy converting means includes the vane which radially moves into and out of the rotor and has its outer peripheral surface in slidable contact with the inner peripheral surface of the rotor chamber.

With the above-described fifteenth arrangement, the first energy converting means includes the cylinder radially formed in the rotor rotatably accommodated in the rotor chamber and the piston sliding in the cylinder, whereby the sealing performance of the high pressure vapor can be increased to permit minimizing an efficiency reduction due to a leak. The second energy converting means includes the vane which is supported by the rotor movably in the radial direction and is in slidable contact with the inner peripheral surface of the rotor chamber, whereby a structure of a conversion mechanism between the pressure energy and mechanical energy can be simplified to permit dealing with a large flow amount of vapor with a compact structure. Thus, by the combination of the first energy converting means including the cylinder and piston with the second energy converting means including the vane, a high performance rotary type fluid machine having both features can be obtained.

In addition to the above-described fifteenth arrangement, a roller associating with the vane and piston is provided, and by placing the roller in engagement with a non-circular annular groove formed in a casing comparting the rotor chamber, reciprocating motion of the piston and rotary motion of the rotor are mutually converted and a clearance between the outer peripheral surface of the vane and the inner peripheral surface of the rotor chamber is regulated.

With the above-described sixteenth arrangement, a roller associating with the vane and piston moving in the radial direction with respect to at least the rotor rotating in the rotor chamber is provided, and the roller is placed in engagement with the non-circular annular groove formed in the casing comparting the rotor chamber, so that the reciprocating motion of the piston can be converted to the rotary motion of the rotor with a simple structure including the roller and annular groove, and further, guiding a moving track of the roller with the annular groove can regulate the clearance between the outer peripheral surface of the vane and the inner peripheral surface of the rotor chamber to prevent occurrence of abnormal friction or occurrence of a leak.

In addition to the fourteenth arrangement, the high pressure and high temperature vapor is disposed on the central side of the rotor chamber which rotatably accommodates the rotor including the first and second energy converting means and the reduced temperature and reduced pressure vapor is disposed on the outer peripheral side of the rotor chamber.

With the above-described seventeenth arrangement, the high temperature and high pressure vapor and the reduced temperature and reduced pressure vapor are respectively disposed on the central side and outer peripheral side of the rotor chamber which rotatably accommodates the rotor, whereby the high temperature and high pressure vapor leaked from the central side of the rotor chamber can be captured and recovered by the reduced temperature and reduced pressure vapor on the outer side of the rotor chamber to increase efficiency of the whole rotary type fluid machine utilizing the leaked high temperature and high pressure vapor without waste. Further, the reduced temperature and reduced pressure vapor is disposed on the outer peripheral side of the rotor chamber, which facilitates a seal for preventing an outward leak of the vapor from the rotor chamber and also facilitates heat insulation for preventing an outward leak of the heat from the rotor chamber.

In addition to the above-described seventeenth arrangement, the first energy converting means includes a cylinder radially formed in the rotor rotatably accommodated in the rotor chamber and a piston sliding in the cylinder, and the second energy converting means includes a vane which radially moves into and out of the rotor and has its outer peripheral surface in slidable contact with an inner peripheral surface of the rotor chamber.

With the above-described eighteenth arrangement, the first energy converting means includes a cylinder radially formed in a rotor rotatably accommodated in the rotor chamber and a piston sliding in the cylinder, whereby the sealing performance of the high pressure vapor can be minimized an efficiency reduction due to a leak. The second energy converting means includes a vane which is supported by the rotor movably in a radial direction and is in slidable contact with the inner peripheral surface of the rotor chamber, whereby a structure of a conversion mechanism between the pressure energy and mechanical energy can be simplified to permit dealing with a large flow amount of vapor with a compact structure. Thus, by the combination of the first energy converting means including the cylinder and piston with the second energy converting means including the vane, a high performance rotary type fluid machine having both features can be obtained.

Next, a second embodiment of the present invention will be described on the basis of FIGS. 12A and 12B.

Formed on an inner periphery of an outer end in a radial direction of a large diameter cylinder hole f of twelve cylinder members 39 radially buried in the rotor 31 is an annular drain groove 121. The drain groove 121 is covered with a piston 41 slidably fitted to the large diameter cylinder hole f. However, when the piston 41 reaches the top dead center shown in FIG. 12A in a terminal stage of an expanding process, a part of an inner side in a radial direction of the drain groove 121 is opened by the piston 41 and water stored in the large diameter cylinder f is introduced in the drain groove 121. When the piston 41 reaches the bottom dead center shown in FIG. 12B in a terminal stage of a discharging process, a part of an outer side in a radial direction of the drain groove 121 is opened by the piston 41 and water stored in the drain groove 121 is exhausted into a slot-shaped space 34. In this way, with a simple machining of forming the annular drain groove 121 on an inner surface of the large diameter cylinder hole f, a water-hammer phenomenon where the water stored in the large diameter cylinder hole f is forced to be compressed by the piston 41 can be avoided, and an amount of exhaust water can be also appropriately adjusted as desired simply by changing depth of the drain groove 121. The inner space of the large diameter cylinder hole f does not directly communicate with each slot-shaped space 34 through the drain groove 121, so that there is no possibility of occurrence of a pressure leak of the high temperature and high pressure vapor.

Next, a third embodiment of the present invention will be described on the basis of FIGS. 13A to 14.

Figure 14:
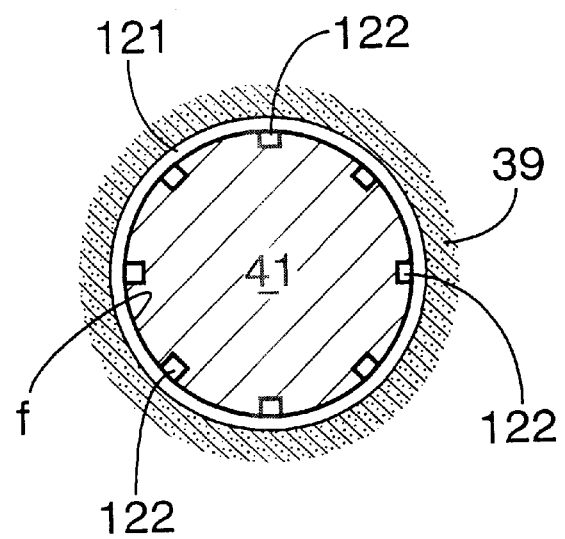

In the third embodiment, in addition to the drain groove 121 of the large diameter cylinder hole f of the cylinder member 39 which is the arrangement of the second embodiment, a large number of drain grooves 122 axially extending on the outer peripheral surface of the outer end in the radial direction of the piston 41 are formed (see FIG. 14). According to the third embodiment, the water can be exhausted into each slot-shaped space 34 through the drain groove 122 of the piston 41 even if the piston 41 is not completely retracted in the large diameter cylinder hole f at the bottom dead center, which permits increasing freedom degree in design of a length of the piston 41.

Next, a fourth embodiment of the present invention will be described on the basis of FIGS. 15A and 15B.

In the fourth embodiment, in addition to the drain groove 121 of the large diameter cylinder hole f of the cylinder member 39 which is the arrangement of the second and third embodiments, a plurality of (in the embodiment four) recesses 123 circumferentially disposed in a longitudinal intermediate portion of the piston 41 are formed. When the piston 41 is at the top dead center position shown in FIG. 15A, the drain groove 121 of the large diameter cylinder hole f is opened by the piston 41 and the recess 123 of the piston 41 communicates with each slot-shaped space 34. When the piston 41 is at the bottom dead center position as shown in FIG. 15B, the communication between the drain groove 121 of the large diameter cylinder hole f and the recess 123 of the piston 41 is released. Thus, the drain groove 121 of the large diameter cylinder hole f communicates with the recess 123 of the piston 41 in the intermediate position (not shown) in FIGS. 15A and 15B.

Therefore, when the piston 41 is at the top dead center, water held by the recess 123 of the piston 41 is exhausted into each slot-shaped space 34, then part of the water is passed from the drain groove 121 of the large diameter cylinder hole f to the recess 123 of the piston 41 during a descent of the piston 41 toward the bottom dead center, and subsequently the water is further passed from the drain groove 121 of the large diameter cylinder hole f to the recess 123 of the piston 41 during a rise of the piston 41 toward the top dead center, and as described above, the water held by the recess 123 of the piston 41 is exhausted into each slot-shaped space 34 when the piston 41 reaches the top dead center.

Figure 16:
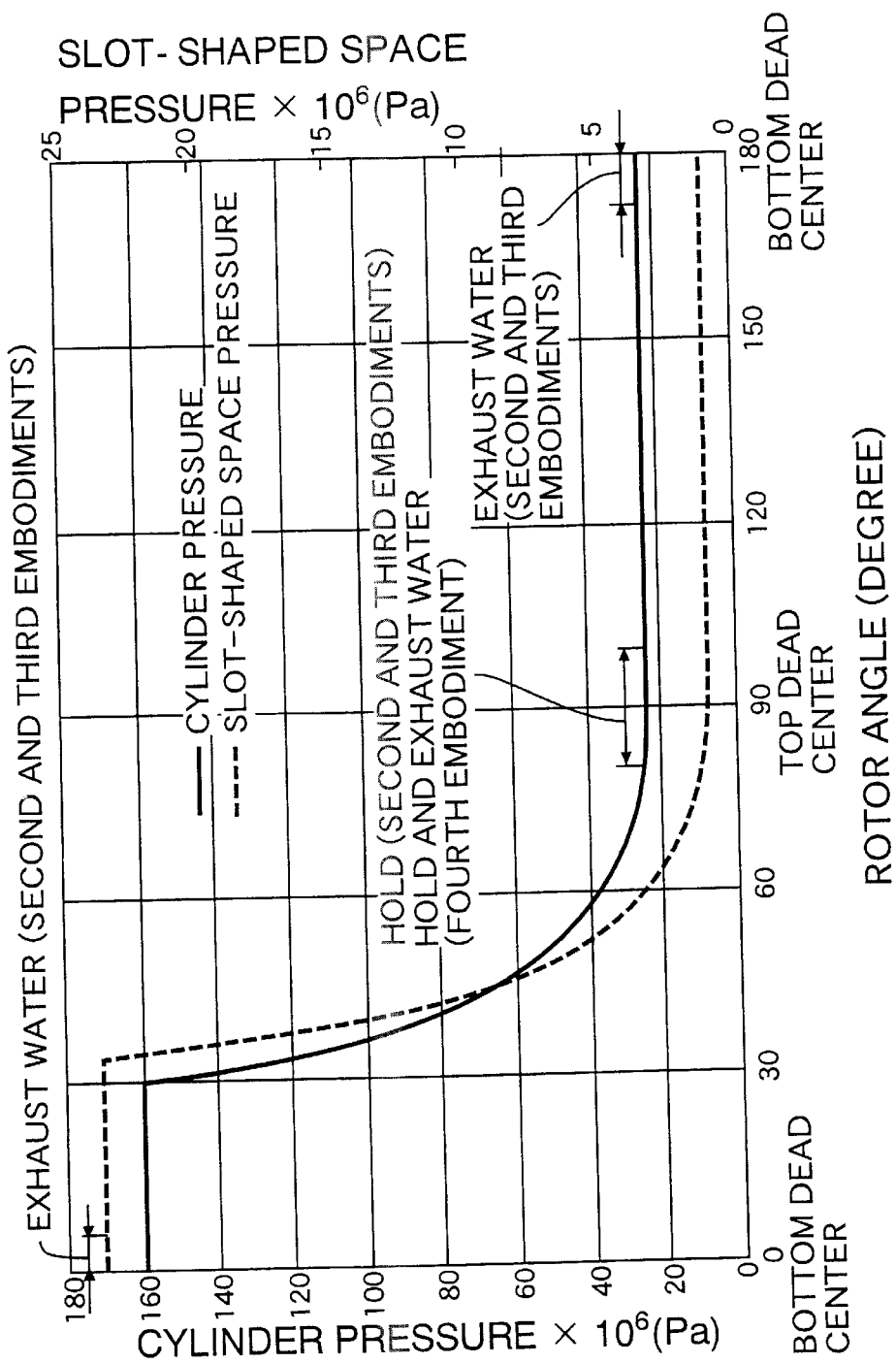
FIG. 16 is an explanatory view of water exhaust timing of the second to fourth embodiments.

Effects of the second to fourth embodiments will be summarized on the basis of a graph in FIG. 16 as follows.

The abscissa axis represents phases of rotary angles of the rotor 31, and the phase 0° and phase 180° show a condition where the piston 41 is at the bottom dead center (see FIGS. 12B, 13B, 15B), and the phase 90° shows a condition where the piston 41 is at the top dead center (see FIGS. 12A, 13A, 15A). In the second and third embodiments, water is exhausted from the large diameter cylinder hole f into each slot-shaped space 34 when the piston 41 is at the bottom dead center. When the piston 41 is at the bottom dead center, both of internal pressure of the large diameter cylinder hole f and internal pressure of each slot-shaped space 34 are $23 \times 10^6$ Pa, so that the water is exhausted without hindrance. In the second and third embodiments, the water is supplied from the inner space of the large diameter cylinder hole f to the drain groove 121 when the piston is around the top dead center. Especially in the fourth embodiment, the water in the recess 123 is exhausted into each slot-shaped space 34 when the piston 41 is around the top dead center, and at this time, the pressure in each slot-shaped space 34 is reduced substantially to atmospheric pressure, thereby providing smooth exhaust of the water.

In the fourth embodiment, the water held by the recess 123 of the piston 41 is exhausted into each slot-shaped space 34 when the phase of the rotary angle of the rotor 31 is around 90°. The drain groove 121 of the second and third embodiments is required to be provided around an opening end of the large diameter cylinder hole f, while the drain groove 121 of the fourth embodiment can be provided apart from the opening end of the large diameter cylinder hole f, so that a seal length of a sliding surface between the piston 41 and the large diameter cylinder hole f can be ensured long enough to minimize an efficiency reduction due to the leak of vapor. Setting a position of the recess 123 can also ease constraint of the length of the piston 41.

In this way, according to the above-described second to fourth embodiments, water condensed in the cylinder member 39 at the time of low temperature actuation or the like or water supplied as a lubricating medium can be surely prevented from being trapped in the cylinder member 39 to inhibit smooth movement of the piston 41.

Next, a fifth embodiment of the present invention will be described with reference to FIGS. 17 to 21.

The fifth embodiment has features in structures of a fixed shaft 65 and a rotary valve V, and a right half of the fixed shaft 65 is formed with a support shaft 131 which has a diameter one stage smaller, and on an outer periphery of the support shaft 131, a plurality of members are axially laminated one on another in a fitted manner to be fixed. That is, a left half of the fixed shaft 65 is formed with a hollow portion 70 into which an inner pipe 77 and an introduction pipe 80 for high temperature and high pressure vapor are coaxially inserted, and to the outer periphery of the support shaft 131 projecting from the right side surface, a passage forming member 132, a carbon valve 133, a spring 134 for seal and an end member 135 are fitted. By fastening a bolt 136 inserted from a right end of the end member 135 to a right end of the support shaft 131 of the fixed shaft 65, the passage forming member 132, carbon valve 133, spring 134 for seal and end member 135 are integrated so as to surround the outer peripheral surface of the support shaft 131.

A metal seal 137 is clamped between the fixed shaft 65 and the passage forming member 132, a metal seal 138 is supported in a sandwiched condition between the passage forming member 132 and the carbon valve 133, a metal seal 139 is supported in a sandwiched condition between the carbon valve 133 and the spring 134 for seal, a metal seal 140 is supported in a sandwiched condition between the spring 134 for seal and the end member 135, and a metal seal 141 is supported in a sandwiched condition between the metal seal 140 and the bolt 136. The carbon valve 133 is made of carbon, and for the fixed shaft 65 and components attached to the fixed shaft 65 other than the carbon valve 133, a ceramic base material having small coefficient of thermal expansion, for example, Inco 909 is adopted. The passage forming member 132 is formed of a member independent of the fixed shaft 65 in terms of machining, and is fixed to the fixed shaft 65 by brazing after assembly.

Two, first and second vapor supply ports 142, 143 having phases 180° shifted open into the outer peripheral surface of the carbon valve 133, and two, first and second recess-shaped exhaust portions 144, 145 having phases shifted with respect to these two vapor supply ports 142, 143 are formed. The first and second vapor supply ports 142, 143 communicate with the introduction pipe 80 for high temperature and high pressure vapor via the carbon valve 133, the passage forming member 132 and high temperature and high pressure vapor passage 146 formed in the fixed shaft 65. On the other hand, respectively formed on the first and second recess-shaped exhaust portions 144, 145 are first and second vapor exhaust ports 147, 148, which communicate with an expansion chamber 20 via a hollow part r, a passage s and each through-hole t (see FIG. 17).

The fixed shaft 65, the passage forming member 132 laminated on the outer periphery of the support shaft 131, the carbon valve 133, the spring 134 for seal and the end member 135 are axially heat expanded and heat compressed, but a spring force of the spring 134 for seal ensures a close contact between the fixed shaft 65 and passage forming member 132 and a close contact between the passage forming member 132 and the carbon valve 133, which ensures sealing performance of the high temperature and high pressure vapor passage 146 passing through the carbon valve 133, the passage forming member 132 and fixed shaft 65, the first and second vapor supply ports 142, 143 and the first and second vapor exhaust ports 147, 148.

Figure 20:
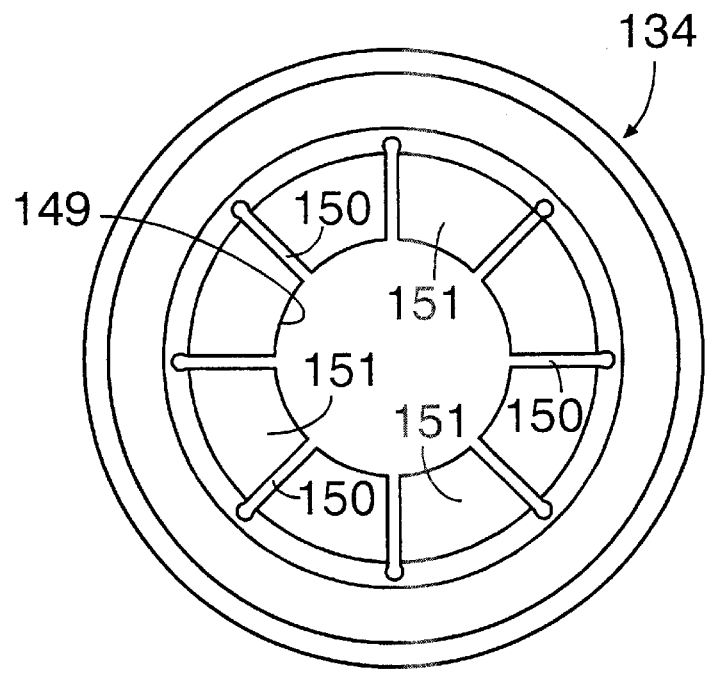

As is clearly shown from FIG. 20, the spring 134 for seal has eight slits 150 radially extending from a circular opening 149 fitted to the outer periphery of the support shaft 131 of the fixed shaft 65, and eight springs 151 sandwiched by the adjacent slits 150 exhibit their spring function.

Formed on a right side surface of the carbon valve 133 opposite a left side surface of the spring 134 for seal is a recess 152, where, for example, five belleville springs 153 are accommodated in a laminated manner. These five belleville springs 153 act so as to help the function of the spring 134 for seal, and cooperation of both of them further ensures the sealing performance of the high temperature and high pressure vapor passage 146, the first and second vapor supply ports 142, 143, and the first and second vapor exhaust ports 147, 148.

Figure 21:
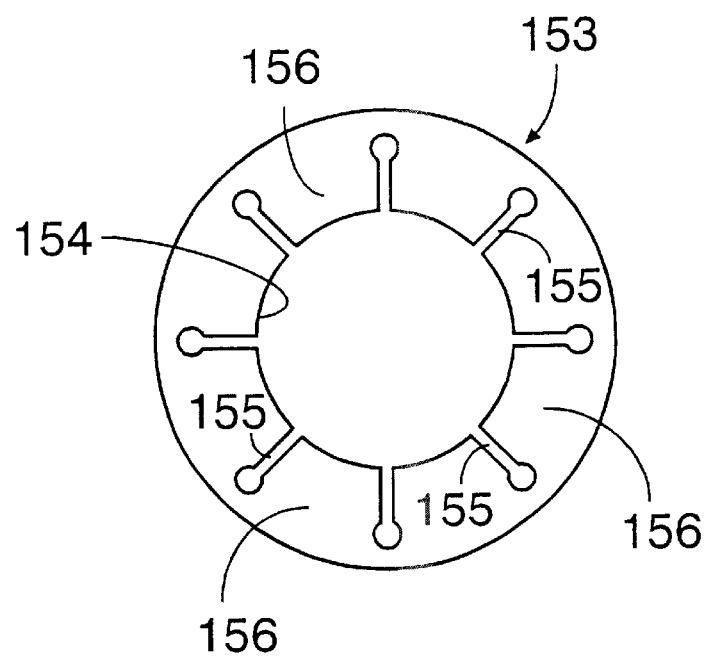
Figure 22:
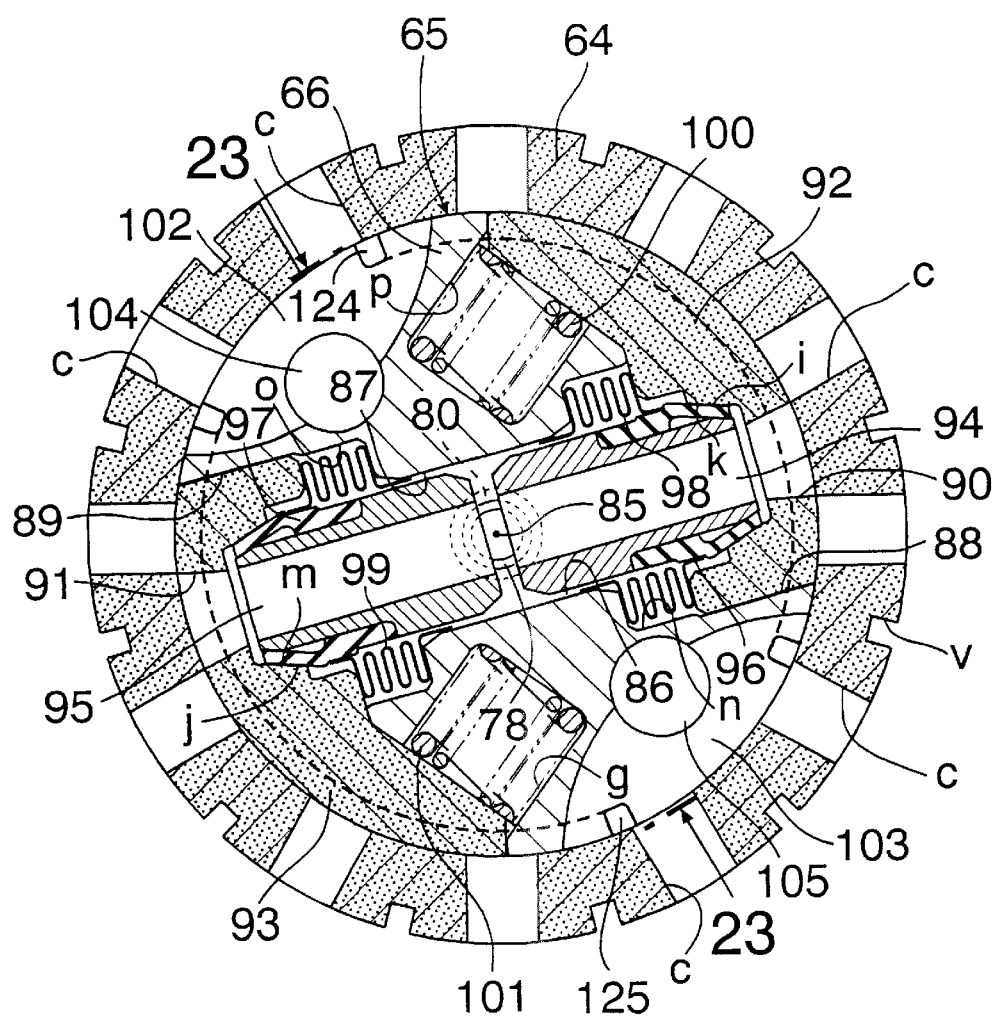
Figure 23:
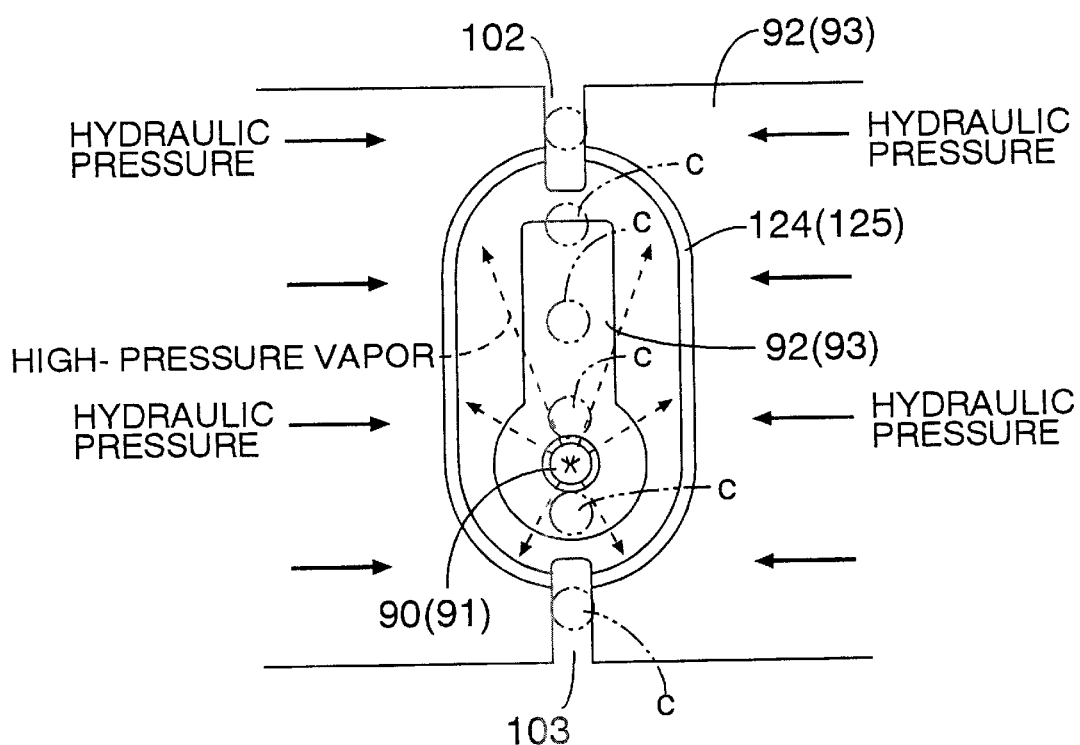
Figure 24:
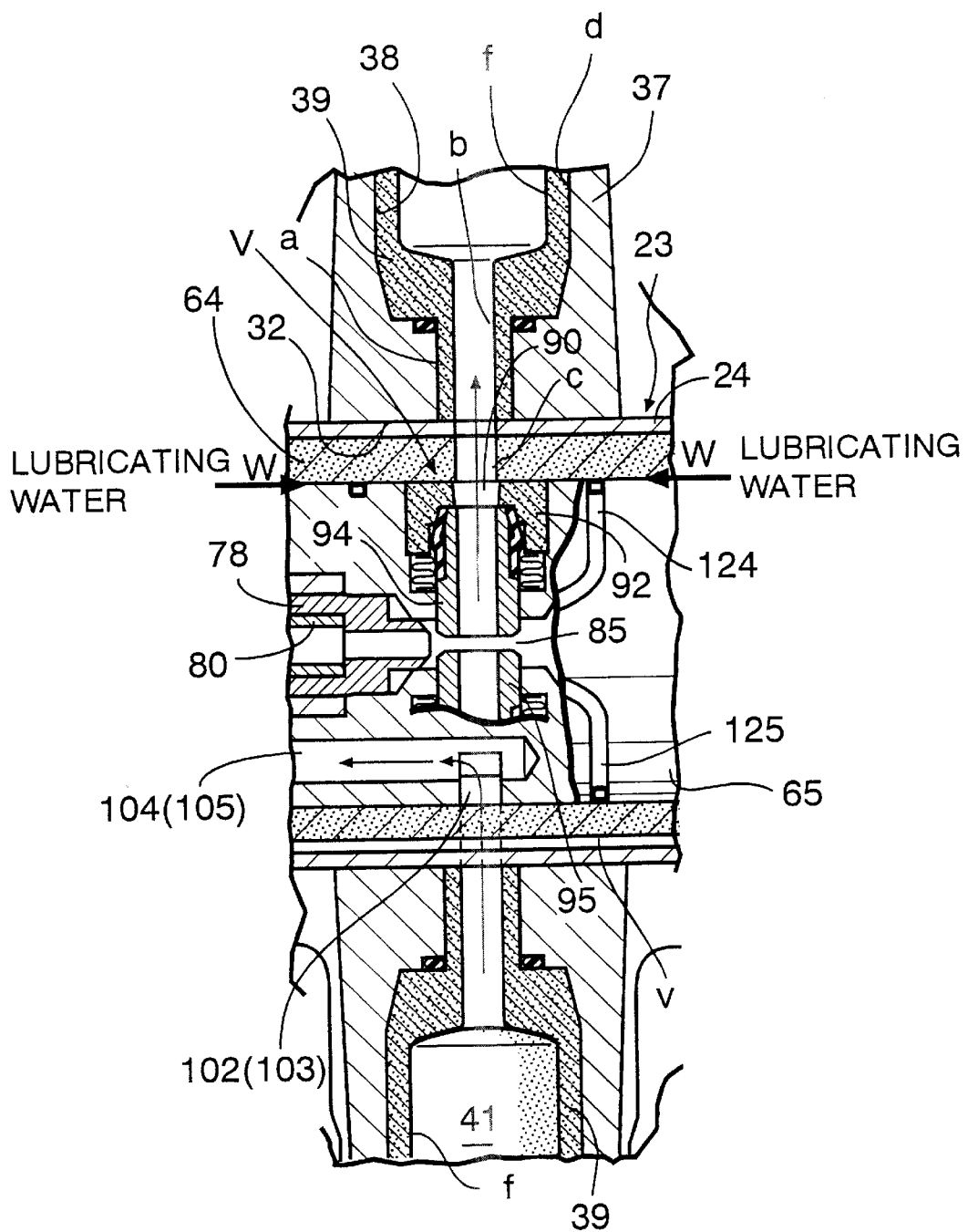
Figure 25:
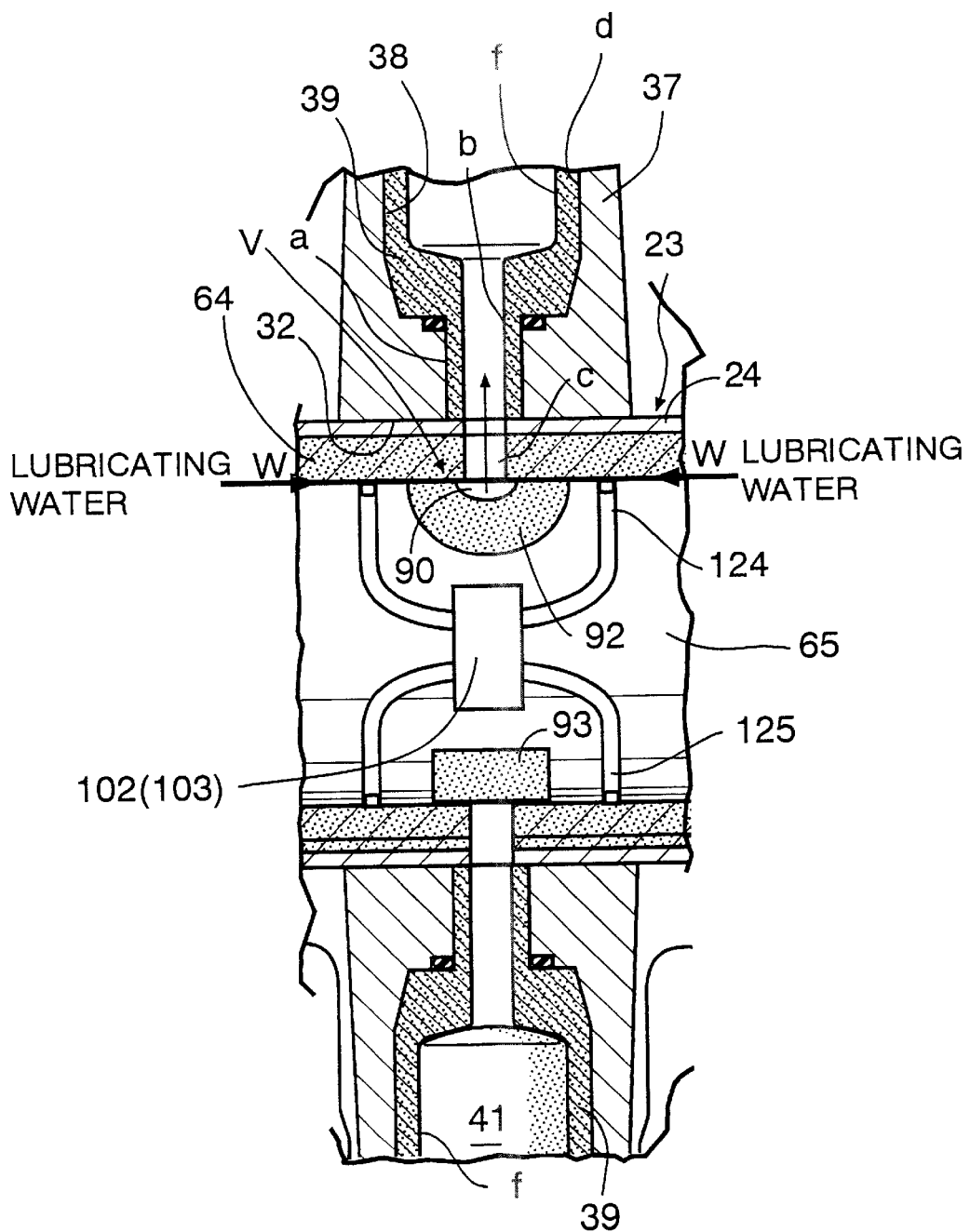

As is clearly shown in FIG. 21, the belleville spring 153 has eight slits 155 radially extending from a circular opening 154 fitted to the outer periphery of the support shaft 131 of the fixed shaft 65, and eight springs 156 sandwiched between the adjacent slits 155 exhibit their spring function.

Figure 17:
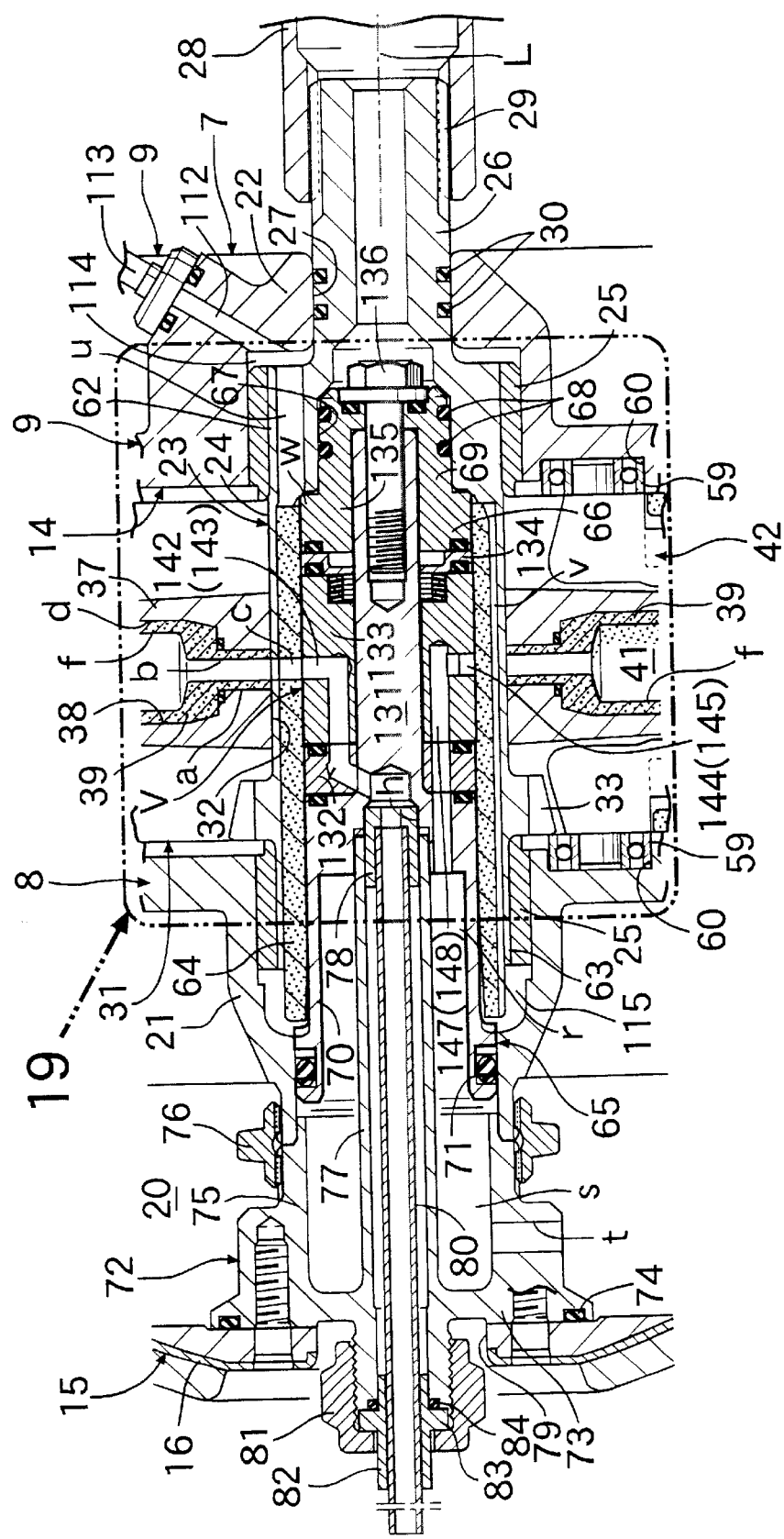
Figure 18:
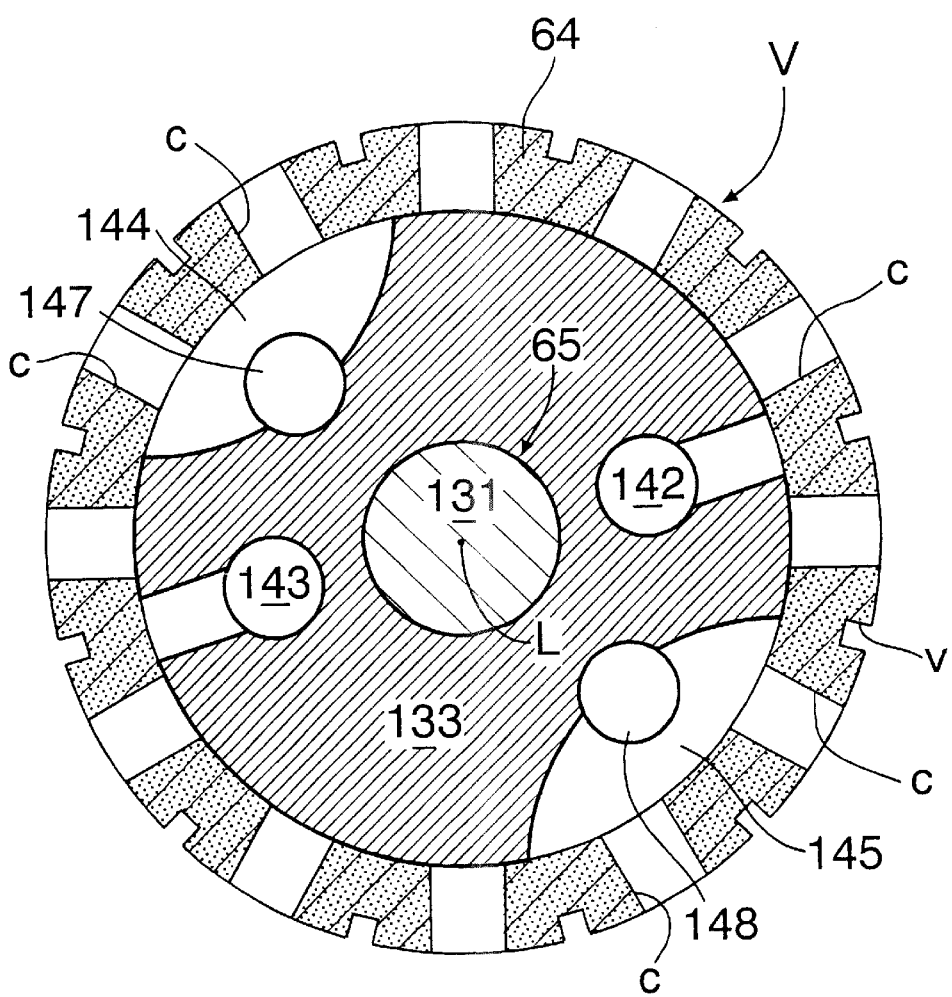
Figure 19:
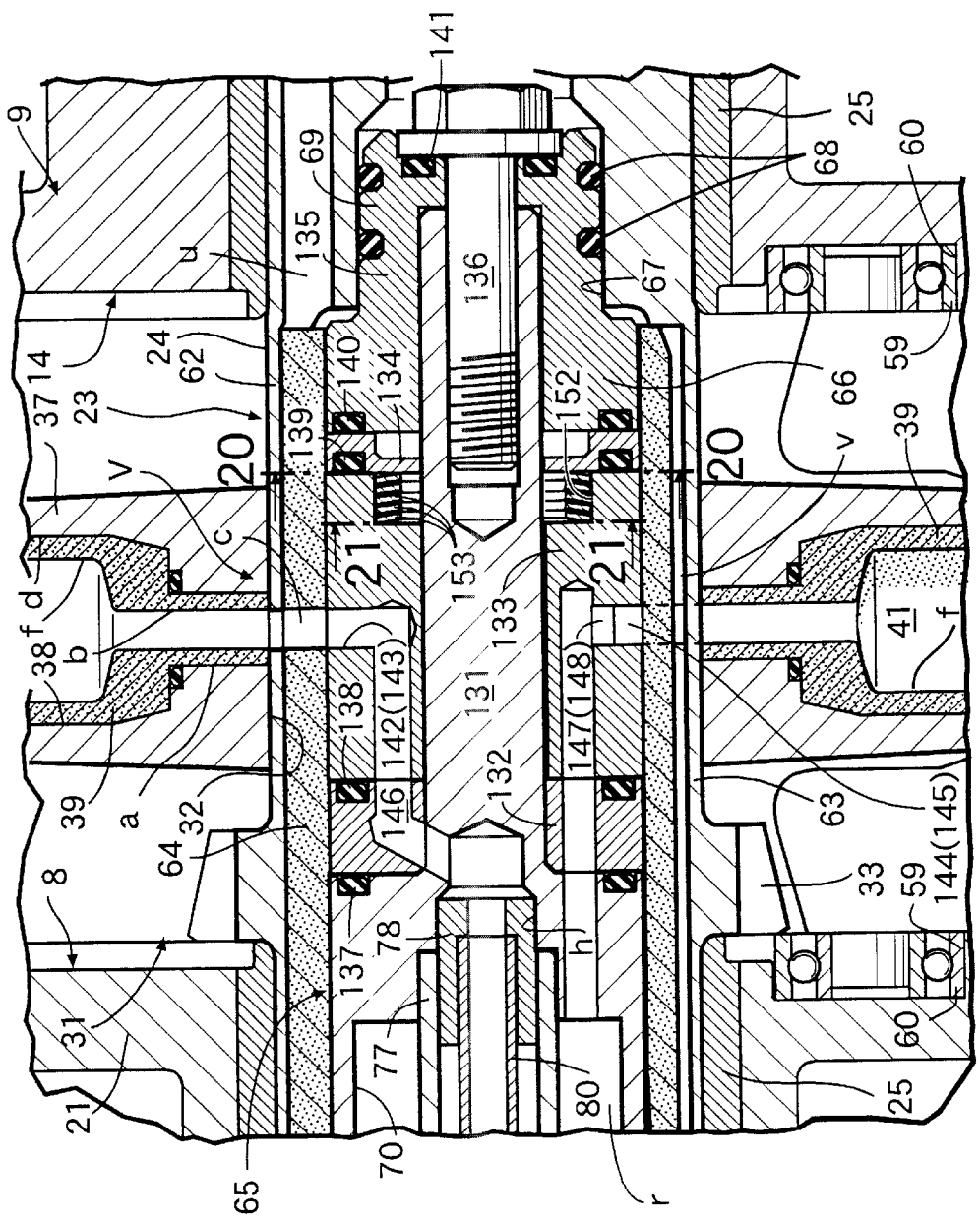

As is shown in FIGS. 17 and 18, the carbon valve 33 provided in the fixed shaft 65 is provided with a rotary valve V as follows, which supplies high temperature and high pressure vapor to the cylinder member 39 of the first to twelfth vane-piston units U1–U12 through a plurality of, in this embodiment twelve through-holes c successively formed on the hollow shaft 64 and the output shaft 23, and exhausts a first reduced temperature and reduced pressure vapor after expansion from the cylinder member 39 through the through-holes c.

The rotary valve V has an extremely simple structure and includes the first and second vapor supply ports 142, 143 opening into the outer periphery of the carbon valve 133 provided in the fixed shaft 65, the first and second vapor exhaust ports 147, 148 opening into the outer periphery of the carbon valve 133 through the first and second recess-shaped exhaust portions 144, 145, and twelve through-holes c formed with a predetermined space on the hollow shaft 64 rotated integrally with the rotor 31. Therefore, when the rotor 31 (that is, the hollow shaft 64) exerts a relative rotation with respect to the fixed shaft 65 (that is, the carbon valve 133), the first and second vapor supply ports 142, 143 opening into the outer periphery of the carbon valve 133 successively communicate with twelve cylinder members 39 through twelve through-holes c of the hollow shaft 64, and twelve cylinder members 39 in which the respective pistons 41 have finished their work successively communicate with the first and second recess-shaped exhaust portions 144, 145 opening into the outer periphery of the carbon valve 133.

Therefore, also referring to FIG. 18, an axis of a first supply pipe 94 is slightly shifted in a counterclockwise direction relative to the short diameter position E of the rotor chamber 14 in FIG. 4, and the first vane-piston unit U1 is located in the short diameter position E and the high temperature and high pressure vapor is not supplied to the large diameter cylinder hole f, and therefore the piston 41 and vane 42 are located in a backward position.

From this condition, the rotor 31 is slightly rotated in the counterclockwise direction in FIG. 4, the first vapor supply port 142 of the carbon valve 133 communicates with the through-hole c, and the high temperature and high pressure vapor from the introduction pipe 80 is introduced in the large diameter cylinder hole f through a small diameter hole b. This causes forward motion of the piston 41, and the forward motion is converted to rotary motion of the rotor 31 by engagement between the roller 59 integral with the vane 42 and the annular groove 60 via the vane 42 due to the vane 42 sliding toward a long diameter position F of the rotor chamber 14. When the through-hole c is shifted from the first vapor supply port 142, the high temperature and high pressure vapor expands in the large diameter cylinder hole f to further move forward the piston 41, and thus the rotation of the rotor 31 is continued. The expansion of the high temperature and high pressure vapor ends when the first vane-piston unit U1 reaches a long diameter position F of the rotor chamber 14. Then, due to the piston 41 moved backward by the vane 42, concurrently with the rotation of the rotor 31, the first reduced temperature and reduced pressure vapor in the large diameter cylinder hole f is exhausted into the junction chamber 20 through the short diameter hole b, the through-hole c, the first recess-shaped exhaust portion 144, first vapor exhaust hole 147, passages (see FIG. 17), and each through-hole t, and then as shown in FIGS. 2 and 5, introduced in the rotor chamber 14 through the first introduction hole group 107 and further expands between the adjacent vanes 42 to rotate the rotor 31, and then the second reduced temperature and reduced pressure vapor is exhausted outwardly from the first leading hole group 110.

As described above, according to the fifth embodiment, the rotary valve V supplying the high temperature and high pressure vapor to the cylinder member 39 and exhausting the reduced temperature and reduced pressure vapor having finished its work from the cylinder 39 is formed to be fitted rotatably and in a sealing condition relative to the carbon valve 133 provided on the outer periphery of the fixed shaft 65 and the hollow shaft 64 provided on the inner periphery of the rotor 41, so that a leak of the vapor can be surely prevented simply by controlling clearance between the carbon valve 133 and hollow shaft 64, and that the need for special energizing means such as a spring or bellows for sealing is eliminated to permit contributing to reduction in the number of components. The clearance of the sliding surface of inner periphery of the carbon valve 133 and the outer periphery of the hollow shaft 64 is, for example, about 5 µm, and this value permits having both sealing performance and durability.

Next, a sixth embodiment of the present invention will be described on the basis of FIGS. 22 to 25.

In the sixth embodiment, first and second port grooves 124, 125 are provided in a carved manner around first and second seal blocks 92, 93 accommodated in the fixed shaft 65. The first and second port grooves 124, 125 provided in the carved manner on the outer peripheral surface of the fixed shaft 65 are of substantially oval shape, and are disposed so as to respectively surround outer peripheries of the first and second seal blocks 92, 93, and communicate, at their both ends on long axis sides, with the first and second recess-shaped exhaust portions 102, 103.

Thus, even when part of the high temperature and high pressure vapor supplied from the first and second supply pipes 94, 95 of the first and second seal blocks 92, 93 leaks along the inner peripheral surface of the hollow shaft 64 without passing through the through-hole c of the hollow shaft 64, the leaked vapor is captured by the first and second port grooves 124, 125 which have pressure lower than the vapor and is supplied to the first and second recess-shaped exhaust portions 102, 103, and supplied therefrom to the rotor chamber 14 through the first and second exhaust ports 104, 105 to be set driven by the vane 42. That is, the high temperature and high pressure vapor which has not passed through the through-hole c of the hollow shaft 64 and has not been used for driving the piston 41 is also used for driving the vane 42 by being captured by the first and second port grooves 124, 125, thereby contributing to improvement in energy efficiency of the whole expanding machine 4.

Pressure of lubricating water supplied to the sliding surface of the fixed shaft 65 and the hollow shaft 64 (see arrows W in FIGS. 24 and 25) is set higher than the pressure of the reduced temperature and reduced pressure vapor which attempts to leak from the first and second recess-shaped exhaust portions 102, 103 along the inner peripheral surface of the hollow shaft 64, so that the reduced temperature and reduced pressure vapor does not leak along the inner peripheral surface of the hollow shaft 64, and is introduced in the first and second exhaust ports 104, 105 to be effectively used for driving the vane 42.

In the above-described embodiment, description is made to the case of using the rotary type fluid machine as the expanding machine 4, but the first and second port grooves 124, 125 also function effectively when using the rotary type fluid machine as a compressing machine. That is, the rotor 31 is rotated by the output shaft 23 and outside air is sucked from the first and second leading hole groups 110, 111 into the rotor chamber 14 by the vane 42 and is compressed, the compressed air thus obtained is supplied from the first and second introduction hole groups 107, 108 to the large diameter cylinder hole f through the junction chamber 20, each through-hole t, the passage s, the first and second exhaust holes 104, 105, the first and second recess-shaped exhaust portions 102, 103, and the through-hole c, and is further compressed by the piston 41, and the compressed air can be extracted through the introduction pipe 80 for high pressure vapor.

At this time, compressed air leaked from the through-hole c of the hollow shaft 64 along the inner peripheral surface of the hollow shaft 64 is captured by the first and second port grooves 124, 125 and returned to the first and second recess-shaped exhaust portions 102, 103, so that the compressed air can be supplied from the through-hole c to the large diameter cylinder hole f and compressed again by the piston 41 to prevent reduction in compression efficiency as the compressing machine.

The embodiments of the present invention have been described in detail, however, various changes in design may be made without departing from the spirit.

For example, in the embodiments, the expanding machine 4 is illustrated as the rotary type fluid machine, but the present invention may be applied as a compressing machine.

Further, in the expanding machine 4 of the embodiments, the high temperature and high pressure vapor is supplied to the cylinder member 39 and the piston 41 which are the first energy converting means, and then the first reduced temperature and reduced pressure vapor caused by a reduction in temperature and pressure thereof is supplied to the vane 42 which is the second energy converting means, but for example, vapor with different temperatures and pressures may be individually supplied to the first and second energy converting means, respectively, by placing the through-hole t for exhausting the first reduced temperature and reduced pressure vapor from the first energy converting means shown in FIG. 2 in communication with or in non-communication with the junction chamber 20 and by forming means for permitting individual supply of the vapor to the junction chamber 20 through the shell-shaped member 16 independently of the second energy converting means. Further, the vapor which has passed through the first energy converting means with the temperature and pressure reduced may be further supplied to the second energy converting means at the same time the vapor with different temperatures and pressures of the first and second energy converting means are individually supplied.

Further, in the embodiments, the roller 59 is provided in the vane body 43 of the vane-piston units U1–U12, but the roller 59 may be provided in the other portions of the vane-piston units U1–U12, for example, the piston 41.

Industrial Applicability

As described above, each of a rotary type fluid machine, a vane type fluid machine, and a waste heat recovering device for an internal combustion engine according to the present invention is useful when carrying out conversion of pressure energy to mechanical energy or conversion of the mechanical energy to the pressure energy, and is especially suitable for use as an expanding machine of a Rankine cycle apparatus.

What is claimed is:

1. A rotary fluid machine including a displacement expanding machine provided in a Rankine cycle apparatus where pressure energy of a first temperature and pressure vapor generated by heating water with waste heat from a prime motor is converted to mechanical energy, and a resulting second temperature and pressure vapor is condensed to be again heated by the waste heat, the expanding machine thus converting the pressure energy to mechanical energy, wherein the first temperature and pressure vapor are greater than the second temperature and pressure vapor, and wherein the expanding machine comprises at least first and second energy converting means, and integrates and outputs mechanical energy generated by the first and second energy converting means, respectively, by inputting the pressure energy into the first and second energy converting means to convert the pressure energy to the mechanical energy.

2. The rotary fluid machine according to claim 1, wherein the first energy converting means comprises:

a plurality of cylinders radially formed in a rotor rotatably accommodated in a rotor chamber; and a plurality of pistons, each piston sliding in a corresponding cylinder, and wherein the second energy converting means comprises:

a plurality of vanes which radially move into and out of the rotor, each vane having an outer peripheral surface thereof placed in slidable contact with an inner peripheral surface of the rotor chamber.

3. The rotary fluid machine according to claim 2, further comprising:

a roller associated with each vane and piston, wherein a reciprocating motion of each piston and rotary motion of the rotor are converted and a clearance between the outer peripheral surface of each vane and the inner peripheral surface of the rotor chamber are regulated by placing the roller in engagement with a non-circular annular groove formed in a casing compartmentalizing the rotor chamber.

4. The rotary fluid machine according to claim 1, wherein a first pressure and temperature vapor is disposed on a central side of a rotor chamber which rotatably accommodates a rotor, including the first and second energy converting means, and a second temperature and pressure vapor is disposed on the outer peripheral side of the rotor chamber, wherein the first pressure and temperature vapor is greater than the second pressure and temperature vapor.

5. The rotary fluid machine according to claim 4, wherein the first energy converting means comprises:

a plurality of cylinders radially formed in the rotor rotatably accommodated in the rotor chamber; and a plurality of pistons, each piston sliding in a corresponding cylinder; and wherein the second energy converting means comprises:

a plurality of vanes, each vane radially moving into and out of the rotor and having an outer peripheral surface thereof placed in slidable contact with an inner peripheral surface of the rotor chamber.

* * * * *